United States Patent
Zhang et al.

(10) Patent No.: US 11,916,423 B2
(45) Date of Patent: Feb. 27, 2024

(54) GROUPED CONSENSUS POWER ALLOCATION METHOD FOR MULTIPLE ENERGY STORAGE UNITS

(71) Applicant: GUIZHOU UNIVERSITY, Guiyang (CN)

(72) Inventors: Jing Zhang, Guiyang (CN); Yu He, Guiyang (CN); Luqin Fan, Guiyang (CN); Benjin Long, Guiyang (CN); Rujing Yan, Guiyang (CN)

(73) Assignee: GUIZHOU UNIVERSITY, Guiyang (CN)

( * ) Notice: Subject to any disclaimer, the term of this patent is extended or adjusted under 35 U.S.C. 154(b) by 153 days.

(21) Appl. No.: 17/746,957

(22) Filed: May 18, 2022

(65) Prior Publication Data
US 2023/0327468 A1    Oct. 12, 2023

(30) Foreign Application Priority Data

Apr. 8, 2022   (CN) .......................... 2022103660385

(51) Int. Cl.
*H02J 7/00* (2006.01)
*G05B 19/042* (2006.01)

(52) U.S. Cl.
CPC ........ *H02J 7/00712* (2020.01); *G05B 19/042* (2013.01); *H02J 7/0013* (2013.01); *H02J 7/0048* (2020.01); *G05B 2219/2639* (2013.01)

(58) Field of Classification Search
CPC ..... H02J 7/00712; H02J 7/0013; H02J 7/0048
See application file for complete search history.

(56) References Cited

U.S. PATENT DOCUMENTS

| | | | |
|---|---|---|---|
| 11,811,233 B1* | 11/2023 | Sheehy | H02J 3/381 |
| 2012/0133333 A1* | 5/2012 | Morioka | H02J 7/0049 320/134 |
| 2020/0076208 A1* | 3/2020 | Williams | H02J 7/34 |

OTHER PUBLICATIONS

Grouping control strategy of battery energy storage array based on DMPC weighted consensus algorithm, Guo Wei, et al., Electric Power Automation Equipment, vol. 40, issue 1, Jan. 31, 2020, pp. 133-140.

(Continued)

*Primary Examiner* — Zhipeng Wang
(74) *Attorney, Agent, or Firm* — Zhigang Ma

(57) ABSTRACT

A grouped consensus power allocation method for multiple energy storage units is provided, including determining a grouped coordination control strategy of multiple battery energy storage units (BESUs) of a BESS (battery energy storage system), where the multiple BESUs are communicated through a communication topology and grouped into a charging group and a discharging group, performing power coordination control power coordination control between the charging group and the discharging group based on a distributed algorithm, determining whether a switching between the charging group and the discharging group is triggered during an operation process of the BESS, and switching when it is triggered. The method can reduce the number of charging/discharging state conversions of the BESUs, prolong the service life of energy storage, ensure that the power allocation results meet the power constraints of the BESUs, reduce low-power operation times of the BESUs, and improve the efficiency of energy storage operation.

9 Claims, 7 Drawing Sheets

(56) References Cited

OTHER PUBLICATIONS

CNIPA, Notification of a First Office Action for CN202210366038.5, dated Feb. 21, 2023.
Guizhou University (Applicant), Reply to Notification of a First Office Action for CN202210366038.5, w/ replacement claims, dated Mar. 14, 2023.
Guizhou University (Applicant), Supplemental Reply to Notification of a First Office Action for CN202210366038.5, w/ (allowed) replacement claims, dated Mar. 27, 2023.
CNIPA, Notification to grant patent right for invention in CN202210366038.5, dated Apr. 2, 2023.

* cited by examiner

Interative process of classical weighted consensus algorithm

Interative process of proposed algorithm

GROUPED CONSENSUS POWER ALLOCATION METHOD FOR MULTIPLE ENERGY STORAGE UNITS

FIELD OF THE DISCLOSURE

The disclosure relates to the field of power coordination control of multiple energy storage units, and more particularly to a grouped consensus power allocation method for multiple energy storage units.

BACKGROUND OF THE DISCLOSURE

With the increasingly prominent energy and environmental problems, new energy power generation technologies such as wind energy and solar energy have been rapidly developed. However, affected by climate, environment and other factors, new energy power generation has strong randomness, volatility and intermittency, which restricts the large-scale development and utilization of new energy to a great extent. It is a hot spot to study how to alleviate the adverse impact of new energy on the safe and stable operation of power system, so as to improve its permeability in power system. Battery energy storage has flexible source/load characteristics, and has the characteristics of high energy density, strong regulation ability, flexible allocation and relatively low cost. Using large-capacity battery energy storage to assist new energy power generation is one of effective technical solutions to solve the above problems. Large-capacity energy storage system is often composed of multiple energy storage units, and states of respective energy storage units are different. If the state differences among the respective energy storage units are ignored in the design of the power allocation strategy between the respective energy storage units, the operating conditions of the respective energy storage units will deteriorate, which will greatly deteriorate the regulation ability and operation economy of the energy storage system. Therefore, considering the characteristics of the respective energy storage units, it is of great significance to study how to refine and allocate the power between the respective energy storage units and improve the operating conditions of the respective energy storage units, so as to give full play to the regulation potential of energy storage and improve the operation economy of energy storage.

At present, scholars at home and abroad have done a lot of research on the coordinated power allocation strategy among multiple energy storage units, and the coordinated power allocation strategy can be divided into centralized control and distributed control in terms of control mode. Among them, the centralized control is difficult to meet the control requirements of power grid energy storage system under the high permeability of renewable energy. On the one hand, under the centralized control mode, a control center needs to establish communication with each of the energy storage units, the calculation amount of the control center is large, the calculation efficiency of the control center is low, there are risks such as control center failure and communication failure, and the system reliability is relatively low. On the other hand, under the background of large-scale grid connection of new energy and the gradual complexity and variability of energy structure in the power grid, the flexibility and scalability of the energy storage system are becoming more and more important, and the centralized control mode is difficult to meet the development needs. Based on multi-agent consensus theory, distributed coordinated control can realize the autonomous cooperative control among multiple agents in the system only through the limited data transmission between adjacent agents, eliminates the centralized control center, and has high robustness in dealing with communication changes or faults. Therefore, the distributed coordinated control has high flexibility and scalability and is an effective method to solve the above problems of centralized control, and the distributed coordinated control has been widely used in the field of power system. In addition, a large number of studies have shown that the use of grouping control for multiple energy storage units is conducive to improve the capacity utilization of the energy storage units and prolong the service life of battery energy storage. Therefore, a grouped consensus power allocation method for multiple energy storage units is proposed herein to solve the above problems.

SUMMARY OF THE DISCLOSURE

An objective of the disclosure is to provide a grouped consensus power allocation method for multiple energy storage units to solve the problems existing in the related art.

In order to achieve the above purpose, the disclosure provides a grouped consensus power allocation method for multiple energy storage units, including:

determining a grouped coordination control strategy of multiple battery energy storage units (BESUs), wherein a battery energy storage system (BESS) includes the multiple BESUs, the multiple BESUs are communicated through a communication topology, and the multiple BESUs are grouped into a charging group $C_Z$ and a discharging group $D_Z$; and performing power coordination control between the charging group $C_Z$ and the discharging group $D_Z$ based on a distributed algorithm, and determining whether a switching between the charging group $C_Z$ and the discharging group $D_Z$ is triggered during an operation process of the BESS.

In an embodiment, the determining whether a switching between the charging group $C_Z$ and the discharging group $D_Z$ is triggered includes: switching charging/discharging states of the charging group $C_Z$ and the discharging group $D_Z$, in response to a state of charge (SOC) of any one group of the BESUs reaches an upper threshold or a lower threshold.

In an embodiment, the charging group $C_Z$ and the discharging group $D_Z$ are defined as mutual dual groups. A BESU i of the charging group $C_Z$ and a BESU i° of the discharging group $D_Z$ are mutual dual units when the BESU i and the BESU i° meet a direct intergroup physical communication condition, where i ε {1, 2 ..., n}, i° ε {1, 2 ..., n}, and n is the number of the BESUs in the charging group $C_Z$.

In an embodiment, the performing power coordination control between the charging group $C_Z$ and the discharging group $D_Z$ based on a distributed algorithm includes:

step S31, initializing the BESS; and step S32, determining an adjustment strategy of an adjacency matrix A, including:

determining, by the BESU i, whether a dual group is needed to participate in a process of the iterating, and adjusting the adjacency matrix A through a formula (22) to achieve intergroup coordination in response to the dual group is needed to participate in the process of the iterating, where the formula (22) is expressed as follows:

$$\begin{cases} a_{ii°} = 1 & x_i(k_c) \notin [\underline{x}_i, \overline{x}_i] \\ a_{ii°} = 0 & x_i(k_c) \in [\underline{x}_i, \overline{x}_i] \end{cases}, \tag{22}$$

where $\underline{x}_i$ and $\overline{x}_i$ respectively represent a lower limit and an upper limit of a state constraint of the BESU i as a i-th node, $x_i(k_c)$ represents a state of a consensus variable of the i-th node at a time $k_c$, $a_{ii^\circ}$ represents an element in the adjacency matrix A, $a_{ii^\circ}=1$ represents that the BESU i exchanges data with the BESU i° being a dual unit of the BESU and $a_{ii^\circ}=0$ represents there is no data exchange;

determining whether the BESU i with an initial power of $P_{bi}^0=P_{BS}^{ref}(t)$ exits a communication iteration of a current control cycle, and adjusting the BESS as per a formula (25) in response to it is determined that the BESU i with the initial power exits the communication iteration, otherwise continuing to iterating without the adjusting until reaching a convergence accuracy, where the formula (25) is expressed as follows:

$$\begin{cases} x'_j(k) = x_j(k) + \dfrac{x_i(k)w_i}{d_i(k-1)w_j} \\ x'_i(k) = 0 \qquad\qquad\qquad \forall\, j \in N_i(k-1), \\ a_{ij} = 0 \\ d'_j(k) = d_j(k) - 1 \end{cases} \quad (25)$$

where $a_{ij}$ represents an element in the adjacency matrix A representing a communication network topology, $x_i(k)$ represents a state of the i-th node at a time k, $x_j(k)$ represents a state of a j-th node at the time k, $w_i$ represents a weight coefficient of the BESU i, $w_j$ represents a weight coefficient of a BESU j, $N_i(k-1)$ represents an adjacent node set of the BESU i before exits, $x'_j(k)$ represents a state quantity of the j-th node in $N_i(k-1)$ after the BESU i exits, and $d'_{hd}(k)$ represents the number of the adjacent nodes of the j-th node in $N_i(k-1)$ after the BESU i exits; and calculating a power $P_{bi}(t)$ of each of the multiple BESUs as per a formula (28) in response to the convergence accuracy is reached, where the formula (28) is expressed as follows:

$$\begin{cases} P(t) = WX^* \\ P(t) = [P_{b1}(t), P_{b2}(t), \cdots, P_{bi}(t) \cdots, P_{bn}(t)]^T, \\ P_B(t) = \sum_{i=1}^{n} P_{bi}(t) \end{cases} \quad (28)$$

where $X^*$ represents a convergence state value meeting power constraints of all the n number of nodes, $W=\mathrm{diag}(w_1, w_2, \ldots, w_n)$ represents a weight matrix of the BESS, $P_B(t)$ represents a sum of powers of all the multiple BESUs, and $P_{bi}(t)$ represents the power of the BESU i.

In an embodiment, the S31 includes:

1) defining a total output power of the BESS as $P_{BS}^{ref}(t)$ and an initial power for iterating of the BESU i as $P_{bi}^0$; where one of the BESUs of the charging group $C_Z$ receives the total output power $P_{BS}^{ref}(t)$ when $P_{BS}^{ref}(t)\leq 0$, and one of the BESUs of the discharging group $D_Z$ receives the total output power $P_{BS}^{ref}(t)$ when $P_{BS}^{ref}(t)>0$, thereby, for the BESU i received the total output power $P_{BS}^{ref}(t)$, the initial power $P_{bi}^0$ is expressed as follows:

$$P_{bi}^0 = \begin{cases} P_{BS}^{ref}(t), & i \in C_Z \text{ and } P_{BS}^{ref}(t) \leq 0 \\ P_{BS}^{ref}(t), & i \in D_Z \text{ and } P_{BS}^{ref}(t) > 0, \\ 0, & \text{other conditions} \end{cases} \quad (19)$$

where the BESU i belongs only to the charging group $C_Z$ or the discharging group $D_Z$ at a time t, and the initial power $P_{bi}^0$ is 0 for the other BESUs that do not receive the total output power $P_{BS}^{ref}(t)$.

2) defining an initial state quantity $x_i^0$ for iterating, as per a formula (20) expressed as follows:

$$x_i^0 = w_i^{-1} P_{bi}^0 \quad (20),$$

where $P_{bi}^0$ represents the initial power for iterating of each control cycle of the BESU i, and $x_i^0$ represents an initial value of the consensus variable of each control cycle of the BESU i.

Therefore, the initializing the BESS for iterating is expressed as follows:

$$\begin{cases} P_0(t) = [P_{b1}^0, P_{b2}^0, \cdots, P_{bn}^0]^T \\ X_0 = W^{-1} P_0(t) \end{cases} \quad (21)$$

In an embodiment, before the step S32, the method further includes: obtaining the adjacency matrix A, including:

making the charging group $C_Z$ and the discharging group $D_Z$ of the BESS at an initial time of each control cycle do not exchange information, that is, the BESU i and the dual unit BESU i° thereof correspond to $a_{ii^\circ}=0$, while the charging group $C_Z$ and the discharging group $D_Z$ each are intragroup communicated, and a corresponding adjacency matrix is an initial adjacency matrix $A_0$ expressed as follows:

$$A_0 = \begin{bmatrix} 0 & 1 & 0 & 1 & 0 & 0 & 0 & 0 \\ 1 & 0 & 1 & 0 & 0 & 0 & 0 & 0 \\ 0 & 1 & 0 & 1 & 0 & 0 & 0 & 0 \\ 1 & 0 & 1 & 0 & 0 & 0 & 0 & 0 \\ 0 & 0 & 0 & 0 & 0 & 1 & 0 & 1 \\ 0 & 0 & 0 & 0 & 1 & 0 & 1 & 0 \\ 0 & 0 & 0 & 0 & 0 & 1 & 0 & 1 \\ 0 & 0 & 0 & 0 & 1 & 0 & 1 & 0 \end{bmatrix}, \text{ and}$$

expressing the adjacency matrix A of the BESS at the initial time of iterating of each control cycle as $A=A_0$, where the adjacency matrix A changes with iteration times k.

In an embodiment, the determining, by the BESU i, whether a dual group is needed to participate in a process of iterating includes:

defining the $k_c$ as a positive integer, substituting $X_0$ into a formula (12) for iterating:

$$X(k+1) = M(k)X(k) + W^{-1}U(k) \quad (12),$$

where M(k) represents a non-negative row random matrix, U(k) represents a decoupling control quantity; $X_0 = [x_1^0, x_2^0, \ldots, x_n^0]^T$, where $x_n^0$ is a state of an n-th BESU at the initial time; $X(k)=[x_1(k), x_2(k), \ldots, x_n(k)]^T$, where $x_n(k)$ is a state of the n-th BESU at the time k; and $X(k+1)=[x_1(k+1), x_2(k+1), \ldots, x_n(k+1)]^T$, where $x_n(k+1)$ is a state of the n-th BESU at a time k+1;

when a $k_c$-th time of iterating is ended, determining, by a BESU i, the total output power $P_{BS}^{ref}(t)$ of the BESS at this time exceeds a total response capacity of the group where the BESU i is located in response to the state $x_i(k_c)$ of the BESU i still does not meet the state constraint, requesting the dual group to participate in consumption and letting $a_{ii^\circ}=1$; otherwise letting $a_{ii^\circ}=0$ and continuing to iterating until reaching the convergence accuracy.

In an embodiment, the method further includes: setting the state constraint, including:

setting a state of the consensus variable of the i-th node at the time k as $x_i(k)$ in considering of the BESS with n numbers of agent nodes as $x_i(k)$; where the state constraint of the consensus variable of the i-th node is expressed as follows:

$$x_i(k) \in [\underline{x}_i, \bar{x}_i],$$

where $[\underline{x}, \bar{x}]$ represents an intersection of constraints of all the n number of nodes, $[\underline{x}, \bar{x}] = \cap_{i=1}^{n}[\underline{x}_i, \bar{x}_i]$, and $x_i$ represents a power related quantity;

introducing a variable $r_{ij}(k)$ on a basis of an ordinary weighted-consensus algorithm to realize that a distributed power coordinated allocation result meets power constraints of the respective BESUs, where an iterating and updating method of the consensus variable is expressed by a formula (1) as follows:

$$x_i(k+1) = x_i(k) + \varepsilon w_i^{-1} \Sigma_{j \in N_i(k)} r_{ij}(k) a_{ij} \cdot (s_j(k) - x_i(k)), \forall i \in \mathbb{Z}_n \quad (1),$$

where $\varepsilon$ represents a convergence coefficient and $\varepsilon > 0$; for an undirected graph, $a_{ij}$ is expressed as $a_{ij} = 1$ when the i-th node and the j-th node have direct data exchange, otherwise $a_{ij} = 0$; $N_i$ represents an adjacent node set of the i-th node, depending on the communication network topology and changing with a change of the communication network topology; $\mathbb{Z}_n$ represents a set of the all the n number of nodes of the BESS; and $r_{ij}(k)$ represents an artificially introduced variable.

In an embodiment, the method further includes: obtaining the weight coefficient by a formula (3) expressed as follows:

$$w_i = \frac{w_i' n \varepsilon}{\min_{\forall i \in \mathbb{Z}_n} \{w_i'\}}, \quad (3)$$

where $w_i'$ is expressed as $$w_i' = \begin{cases} E_{ba,i} \cdot SOC_B^{max} - E_{b,i}(t), & P_{BS}^{ref}(t) \leq 0 \\ E_{b,i}(t) - E_{ba,i} \cdot SOC_B^{min}, & P_{BS}^{ref}(t) > 0 \end{cases},$$

$E_{ba,i}$ represents a capacity of the BESU i, $E_{b,i}(t)$ represents a residual capacity at the current time of the BESU i, n is the number of the BESUs, $SOC_B^{max}$ represents an upper limit of a state of charge of each of the BESUs, and $SOC_B^{min}$ represents a lower limit of the state of charge of each of the BESUs.

In an embodiment, the method further includes obtaining the introduced variable $r_{ij}(k)$, including:

adjusting a constraint range by:

defining $\Delta_i^u(k)$ as a distance between the state $x_i(k)$ and the upper limit $\bar{x}_i$ and defining $\Delta_i^l(k)$ as a distance between the state $x_i(k)$ and the lower limit $\underline{x}_i$, where $\Delta_i^u(k)$ and $\Delta_i^l(k)$ are respectively expressed as follows:

$$\begin{cases} \Delta_i^u(k) = |x_i(k) - \bar{x}_i| \\ \Delta_i^l(k) = |x_i(k) - \underline{x}_i| \end{cases}, \quad (4)$$

adjusting the upper limit and the lower limit during iterating as per a formula (5) and a formula (6) in order to make a state outside of the constraint range be transferred to be within the constraint range in a process of iterating, where the formula (5) and the formula (6) are respectively expressed as follows:

$$\bar{x}_i' = \begin{cases} \bar{x}_i - \tau \Delta_i^u(k) & x_i(k) > \bar{x}_i \\ \bar{x}_i & x_i(k) \leq \bar{x}_i \end{cases}, \quad (5)$$

$$\underline{x}_i' = \begin{cases} \underline{x}_i + \tau \Delta_i^l(k) & x_i(k) < \underline{x}_i \\ \underline{x}_i & x_i(k) \geq \underline{x}_i \end{cases}, \quad (6)$$

the formula (5) and the formula (6) each represent that a constraint boundary is adjusted according to a distance between a current state and the constraint boundary, so that the state outside the constraint range is transferred to be within the state constraint in the process of iterating, and a value range of $\tau$ is:

$$0 < \tau < \min\left(\frac{|\bar{x}_i|}{\Delta_i^u(k)}, \frac{|\underline{x}_i|}{\Delta_i^l(k)}\right);$$

calculating intermediate variables as per a formula (7) expressed as follows:

$$\begin{cases} \Delta \bar{x}_i(k) = |x_i(k) - \bar{x}_i'| \\ \Delta \underline{x}_i(k) = |x_i(k) - \underline{x}_i'| \end{cases}, \quad (7)$$

calculating the variable $r_{ij}(k)$, including: sending, by the i-th node, the intermediate variables $(\Delta \bar{x}_i(k), \Delta \underline{x}_i(k))$ and the state $x_i(k)$ to adjacent nodes, and receiving intermediate variables and a state of adjacent j-th node for calculating the variable $r_{ij}(k)$ as per a formula (8) expressed as follows:

$$r_{ij}(k) = \begin{cases} \min\left\{1, \frac{\Delta \bar{x}_i(k)}{|\sigma_{ij}(k)|}, \frac{\Delta \underline{x}_j(k)}{|\sigma_{ij}(k)|}\right\} & \sigma_{ij}(k) > 0 \\ \min\left\{1, \frac{\Delta \bar{x}_j(k)}{|\sigma_{ij}(k)|}, \frac{\Delta \underline{x}_i(k)}{|\sigma_{ij}(k)|}\right\} & \sigma_{ij}(k) < 0 \\ 1 & \sigma_{ij}(k) = 0 \end{cases}, \quad (8)$$

where $\sigma_{ij}(k) = x_j(k) - x_i(k)$, $j \in N_i(k)$; $r_{ij}(k)$ is configured to prevent $x_i(k)$ from exceeding the constraint boundaries in the process of iterating when transferring along a direction approaching the constraint boundaries to thereby ensure that a convergence result meets the state constraint.

The embodiments of the disclosure may mainly have beneficial effects as follows.

The BESS includes the multiple BESUs. The multiple BESUs are set to be communicated through the communication topology. The multiple BESUs are divided into the charging group $C_Z$ and the discharging group $D_Z$, so that switching times of charging/discharging states of the multiple BESUs are reduced, and the service life of energy storage operation is prolonged. Using the distributed algorithm, the grouping distributed coordinated control of the BESS can reduce the switching times of charging/discharging states of the multiple BESUs and prolong the service life of energy storage operation. In addition, it can ensure that the power allocation results meet the power constraints of the multiple BESUs, reduce the times of low-power operation of the multiple BESUs and improve the efficiency of energy storage operation.

BRIEF DESCRIPTION OF DRAWINGS

The accompanying drawings, which are incorporated in and constitute a part of the disclosure, are intended to provide a further understanding of the disclosure. The illustrative embodiments of the disclosure and descriptions thereof are used to explain the disclosure and do not constitute undue restrictions on the disclosure. In the accompanying drawings.

DETAILED DESCRIPTION OF EMBODIMENTS

Figure 1:
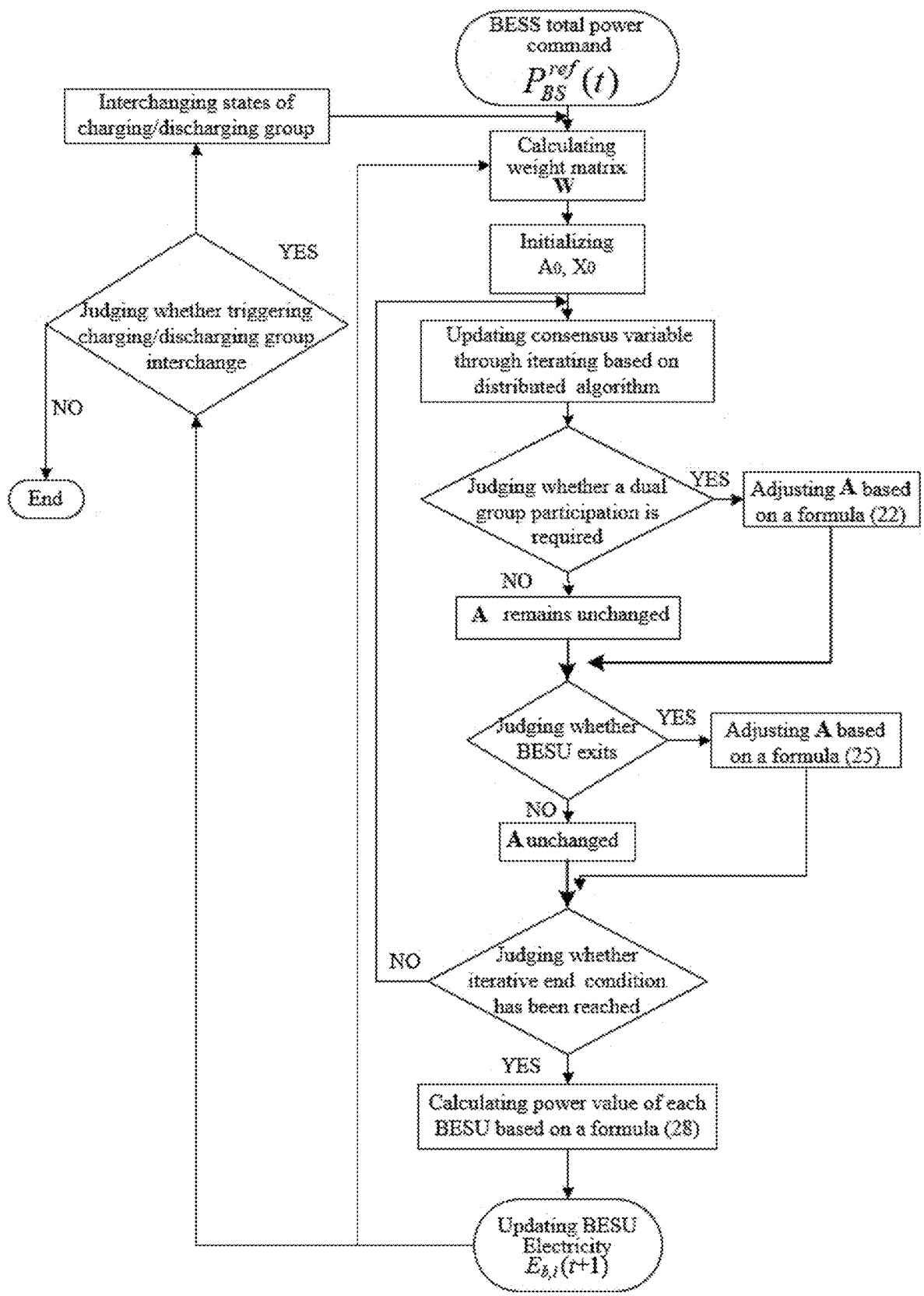
FIG. 1 illustrates a schematic flowchart of a battery energy storage system (BESS) control according to an embodiment of the disclosure.

It should be noted that embodiments in the disclosure and features in the embodiments can be combined with each other without conflict. Hereafter, the disclosure will be described in detail below with reference to the accompanying drawings and in combination with the embodiments.

It should be noted that the steps shown in the flowcharts of the accompanying drawings may be exemplarily performed in a computer system with a set of computer executable instructions, and although a logical order is shown in the flowcharts, in some cases, the steps shown or described may be performed in a different order than here.

As shown in FIGS. 1-10, this embodiment provides a grouped consensus power allocation method for multiple energy storage units, including:

determining a grouped coordination control strategy of multiple battery energy storage units (BESUs); and performing power coordination control by using a weighted-consensus algorithm based on distributed model predictive control (DMPC) and considering consensus variable constraints.

In an illustrated embodiment, the determining a grouped coordination control strategy of multiple BESUs may include steps as follows.

Due to the great uncertainty, randomness and volatility of new energy power generation, to effectively alleviate adverse impacts of the new energy power generation on a power system, it is necessary for an energy storage system to frequently switch between charging/discharging states, which accelerates the decline of energy storage life to a certain extent.

In order to reduce the switching times of charging/discharging states of the multiple BESUs, the multiple BESUs in a battery energy storage system (BESS) are divided into two groups Z1 and Z2. When one group is a charging group and the other group is a discharging group, the multiple BESUs are communicated with each other through a communication topology. The charging group is defined as $C_Z$ and the discharging group is defined as $D_Z$. For the convenience of subsequent expression, it is defined the charging group $C_Z$ and the discharging group $D_Z$ as mutual dual groups. When a BESU i of the charging group $C_Z$ and a BESU i° of the discharging group $D_Z$ meet a direct intergroup physical communication condition (as shown by broken lines in FIG. 10), the BESU i and the BESU i° are mutual dual units, where i $\varepsilon$ {1, 2 . . . , n}, and i°$\varepsilon$ {1, 2 . . . , n}, and {1, 2 . . . , n} respectively represent serial numbers of the multiple BESUs. During operation, when a state of charge (SOC) of any one group of the BESUs reaches an upper threshold or a lower threshold, charging/discharging states of the charging group $C_Z$ and the discharging group $D_Z$ are switched, that is, the original charging group $C_Z$ is converted to the discharging group $D_Z$ and the original discharging group $D_Z$ is converted to the charging group $C_Z$.

Research shows that the energy conversion efficiency of the BESU is closely related to the operating power. When the operating power per unit value is small, the loss of electrical equipment is large, which leads to the low energy conversion efficiency of the BESUs. When the operating power per unit value is large, the energy conversion efficiency is high. Therefore, the unnecessary energy loss caused by the low efficiency operation of the BESUs can be reduced, so as to improve the energy conversion efficiency.

Figure 4:
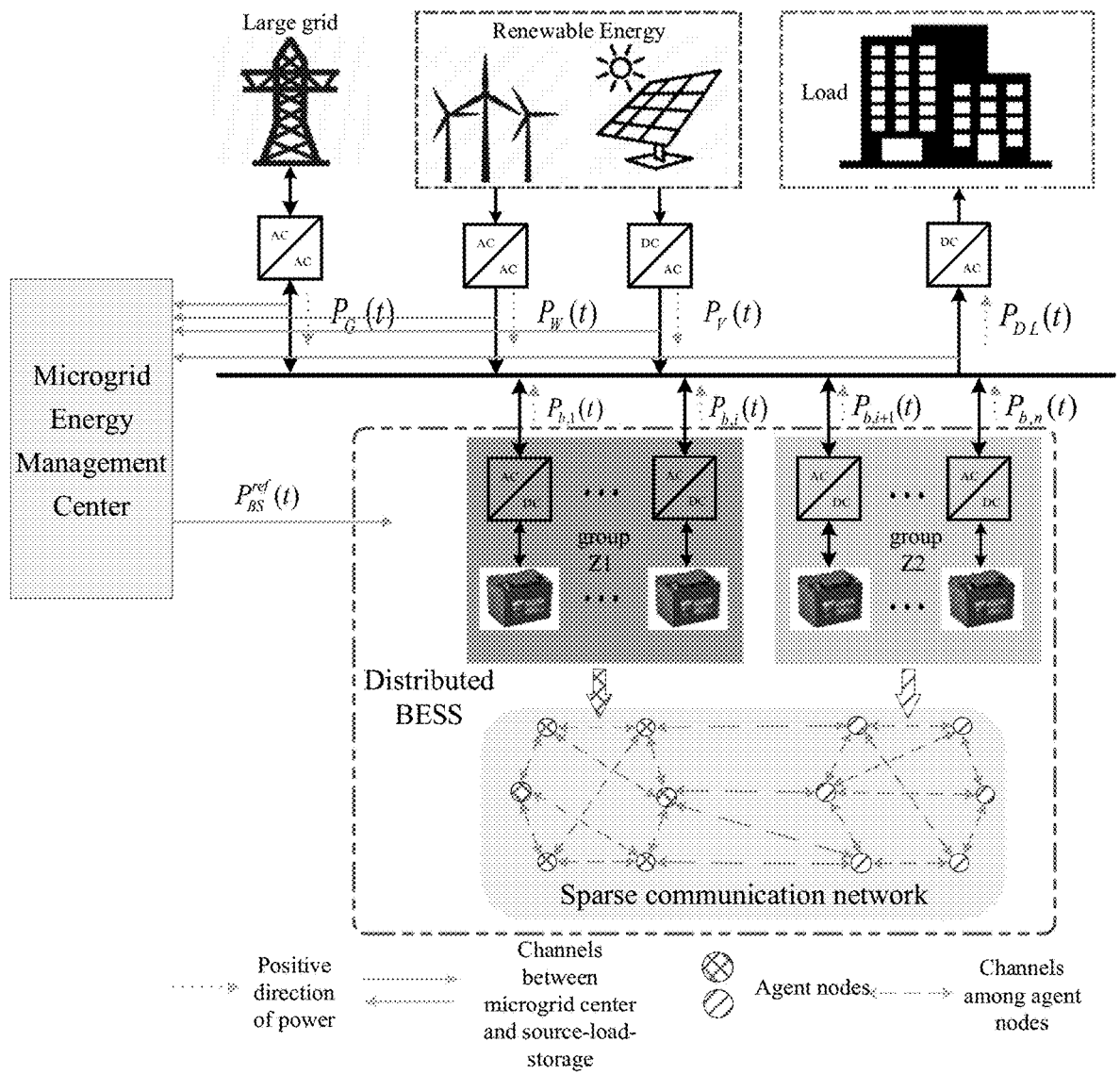
FIG. 4 illustrates a schematic structural diagram of a grid-connected microgrid with wind charge storage and optical charge storage according to an embodiment of the disclosure.

As shown in FIG. 4, a distributed BESS is composed of multiple BESUs and sparse communication networks. Each of the multiple BESUs may be an agent with certain communication, calculation and control capabilities. In order to realize distributed coordination of the output of each of the multiple BESUs, ensure that power instructions of the multiple BESUs meet power constraints and a principle of "capable people do more work", improve consensus of the multiple BESUs and improve a convergence speed of a distributed algorithm, the disclosure proposes a weighted-consensus algorithm based on DMPC considering consensus variable constraints. In this situation, each of the multiple BESUs is performed a limited data exchange with adjacent BESUs without a central node or a "leader" node, that is, an adaptive power allocation between the multiple BESUs can be completed in a very short time. Specifically, the algorithm is described as follows.

Step S1, considering the consensus variable constraints.

A distributed BESS with n numbers of agent nodes is considered. A state of a consensus variable of an i-th node at a time k is defined as $x_i(k)$. A state constraint the consensus variable of the i-th node is expressed as follows:

$$x_i(k)\varepsilon[\underline{x}_i,\overline{x}_i],$$

where $\underline{x}_i$ and $\overline{x}_i$ respectively represent a lower limit and an upper limit of the state constraint of the BESU i as an i-th node, $[\underline{x}, \overline{x}]$ represents an intersection of constraints of all the n numbers of nodes, $[\underline{x}, \overline{x}] = \cap_{i=1}^{n}[\underline{x}_i, \overline{x}_i]$, and $x_i$ represents a power related quantity. Specifically, $x_i$ is a physical quantity related to weight and power, see a formula (1a) for details, and the upper and lower limits of the state constraint can be calculated according to a formula (1b) as follows.

In order to realize that coordinated allocation of distributed power meets power constraints of the multiple BESUs, a variable $r_{ij}(k)$ is first introduced based on a classical weighted-consensus algorithm (also referred to as an ordinary weighted-consensus algorithm). An updating method of iterating is expressed by a formula (1) as follows:

$$x_i(k+1) = x_i(k) + \varepsilon w_i^{-1} \Sigma_{j \in N_i(k)} r_{ij}(k) a_{ij} \cdot (s_j(k) - x_i(k)), \forall i \in \mathbb{Z}_n \quad (1),$$

where $\varepsilon$ represents a convergence coefficient and $\varepsilon > 0$; $a_{ij}$ represents an element in an adjacency matrix A representing a communication network topology, for an undirected graph, $a_{ij} = 1$ when the i-th node and a j-th node have direct data exchange, otherwise $a_{ij} = 0$; $N_i$ represents an adjacent node set of the i-th node, depending on the communication network topology and changing with a change of the communication network topology; $\mathbb{Z}_n$ represents a set of the all then number of nodes of the BESS; and $w_i$ represents a weight coefficient of the BESU i. The weight coefficient is related to the SOC of the BESU. In the illustrated embodiment, a relationship among the weight coefficient $w_i$, the consensus variable $x_i$ and a power $P_{b,i}$ of the BESU i is established, as shown in the formula (1a). A calculation formula of an upper threshold and a lower threshold of a state of the consensus variable $x_i$ of the BESU i in an operation cycle t is shown in a formula (1b). Specifically, the formula (1a) and the formula (1b) are respectively expressed as follows:

$$P_{bi} = w_i x_i, \quad (1a)$$

$$\begin{cases} \overline{x}_i(t) = w_i^{-1} P_{b,i,max}^{dis} \\ \underline{x}_i(t) = w_i^{-1} P_{b,i,max}^{ch} \end{cases}, \quad (1b)$$

where $P_{b,i,max}^{ch}$ and $P_{b,i,max}^{dis}$ respectively represents a maximum allowable discharge power and a maximum allowable charging power in the operation cycle t of the BESU i.

In order to realize that the powers of the multiple BESUs meet the principle of "capable people do more work", the weight coefficient is defined according to a capacity, a residual capacity and other information of the BESU as follows:

$$w'_i = \begin{cases} E_{ba,i} \cdot SOC_B^{max} - E_{b,i}(t), & P_{BS}^{ref}(t) \le 0 \\ E_{b,i}(t) - E_{ba,i} \cdot SOC_B^{min}, & P_{BS}^{ref}(t) > 0 \end{cases}, \quad (2)$$

where $E_{ba,i}$ represents a capacity of the BESU i, and $E_{b,i}(t)$ represents a residual capacity of the BESU i at a current time.

Due to the large battery capacity, when the BESU is discharged (charged), if the residual capacity of the BESU is high (low), and a value of $w'_i$ will be large, while when the convergence coefficient $\varepsilon$ has been given, the weight coefficient that is too large will lead to a slow convergence speed. It is shown that when the convergence coefficient $\varepsilon$ is given, the weight coefficient of the BESS should satisfy $$\min\{w_i\} > \frac{n\varepsilon}{2}, i \in \mathbb{Z}_n$$

to ensure a convergence of the model, and when $\min\{w_i\} = n\varepsilon$ is satisfied, the BESS has a faster convergence speed and a better stability margin. Therefore, the weight coefficient $w_i$ is defined as follows:

$$w_i = \frac{w'_i n\varepsilon}{\min_{\forall i \in \mathbb{Z}_n}\{w'_i\}}, \quad (3)$$

where $w'_i$ is expressed as $$w'_i = \begin{cases} E_{ba,i} \cdot SOC_B^{max} - E_{b,i}(t), & P_{BS}^{ref}(t) \le 0 \\ E_{b,i}(t) - E_{ba,i} \cdot SOC_B^{min}, & P_{BS}^{ref}(t) > 0 \end{cases},$$

$E_{ba,i}$ represents the capacity of the BESU i, $E_{b,i}(t)$ represents the residual capacity at the current time of the BESU i, $\varepsilon$ represents the convergence coefficient, n is the number of the BESUs, $SOC_B^{max}$ represents an upper limit of a state of charge of each of the BESUs, and $SOC_B^{min}$ represents a lower limit of the state of charge of each of the BESUs.

In an illustrated embodiment, $r_{ij}(k)$ in the formula (1) is an artificially defined/introduced variable, which is the key to realize the state constraint of the consensus variable. Calculation steps of the variable $r_{ij}(k)$ are described as follows.

S11, adjusting a restraint range.

A distance between the state $x_i(k)$ and the upper limit $\overline{x}_i$ is defined as $\Delta_i^u(k)$, a distance between the state $x_i(k)$ and the lower limit $\underline{x}_i$ is defined as $\Delta_i^l(k)$, and the distances $\Delta_i^u(k)$ and $\Delta_i^l(k)$ are respectively expressed as the following formula (4):

$$\begin{cases} \Delta_i^u(k) = |x_i(k) - \overline{x}_i| \\ \Delta_i^l(k) = |x_i(k) - \underline{x}_i| \end{cases}. \quad (4)$$

In order to make a state outside of the constraint range be transferred to be within the constraint range in the process of iterating, the upper and lower limits of the state during iterating are adjusted as per formulas (5) and (6) expressed as follows:

$$\overline{x}'_i = \begin{cases} \overline{x}_i - \tau \Delta_i^u(k) & x_i(k) > \overline{x}_i \\ \overline{x}_i & x_i(k) \le \overline{x}_i \end{cases}, \quad (5)$$

$$\underline{x}'_i = \begin{cases} \underline{x}_i + \tau \Delta_i^l(k) & x_i(k) < \underline{x}_i \\ \underline{x}_i & x_i(k) \ge \underline{x}_i \end{cases}, \quad (6)$$

where the formulas (5) and (6) each represent that a constraint boundary is adjusted according to a distance between a current state and the constraint boundary, so that the state outside the constraint range is transferred to be within the state constraint in the process of iterating. A value range of $\tau$ is:

$$0 < \tau < \min\left(\frac{|\overline{x}_i|}{\Delta_i^u(k)}, \frac{|\underline{x}_i|}{\Delta_i^l(k)}\right).$$

S12, calculating intermediate variables as per a formula (7) expressed as follows:

$$\begin{cases} \Delta \bar{x}_i(k) = |x_i(k) - \bar{x}'_i| \\ \Delta \underline{x}_i(k) = |x_i(k) - \underline{x}'_i| \end{cases} \quad (7)$$

S13, calculating the variable $r_{ij}(k)$.

Specifically, the intermediate variables $(\Delta \bar{x}_i(k), \Delta \underline{x}_i(k))$ and the state $x_i(k)$ are sent to adjacent nodes by the node i, and intermediate variables and a state of adjacent j-th node are received by the i-th node for calculating the variable $r_{ij}(k)$ as per a formula (8) expressed as follows:

$$r_{ij}(k) = \begin{cases} \min\left\{1, \frac{\Delta \bar{x}_i(k)}{|\sigma_{ij}(k)|}, \frac{\Delta \underline{x}_j(k)}{|\sigma_{ij}(k)|}\right\} & \sigma_{ij}(k) > 0 \\ \min\left\{1, \frac{\Delta \underline{x}_i(k)}{|\sigma_{ij}(k)|}, \frac{\Delta \bar{x}_j(k)}{|\sigma_{ij}(k)|}\right\} & \sigma_{ij}(k) < 0 \\ 1 & \sigma_{ij}(k) = 0 \end{cases} \quad (8)$$

where $\sigma_{ij}(k) = x_j(k) - x_i(k)$, $j \in N_i(k)$; $x_i(k)$ is configured to prevent $x_i(k)$ from exceeding the constraint boundaries thereof in the process of iterating when transferring along a direction approaching the constraint boundaries to thereby ensure that a convergence result meets the state constraint.

In an illustrated embodiment, $C_{ij}(k) = \varepsilon w_i^{-1} r_{ij}(k)$, $M_{ij}(k) = C_{ij}(k) a_{ij}$, and $M_{ii}(k) = 1 - \Sigma_{j \in N_i(k)} M_{ij}(k)$, $(\forall i \neq j)$ are defined. It can be known that $\varepsilon > 0$, $\forall i \in \mathbb{Z}_n$, and $w_i \geq n\varepsilon$ is satisfied from preset conditions, therefore, a formula (9) is satisfied for $\forall i, j \in \mathbb{Z}_n$, $C_{ij}(k)$, $M_{ij}(k)$, and $M_{ii}(k)$ as follows:

$$\begin{cases} C_{ij}(k) \geq 0, \sum_{j \in N_i(k)} C_{ij}(k) < 1 \\ M_{ij}(k) \geq 0, M_{ii}(k) > 0, \sum_{j=1}^n M_{ij}(k) = 1 \end{cases} \quad (9)$$

Therefore, the formula (1) can be expressed equivalently as:

$$x_i(k+1) = M_{ii}(k) x_i(k) + \Sigma_{j \in N_i(k)} M_{ij}(k) x_j(k) \quad (10)$$

A consensus control rule of the BESS is expressed in a matrix form as follows:

$$X(k+1) = M(k) X(k) \quad (11)$$

From the formula (9), $X(k) = [x_1(k), x_2(k), \ldots, x_n(k)]^T$. From the formula (9), $M(k)$ in the formula (11) is a non-negative row random matrix, its diagonal element $M_{ii}(k)$ is a state conversion term, and its non-diagonal element $M_{ij}(k)$ is a dynamic coupling term. The j-th node has a direct impact on the i-th node when $M_{ij}(k) \neq 0$ is satisfied, otherwise, there is no direct impact.

S2, improving the convergence speed based on the DMPC.

Improving consensus iterative speed of the distributed coordination power allocation is conducive to reducing the response delay of the BESS and improving the effect of energy storage regulation. The introduction of the DMPC into the consensus algorithm can significantly improve the convergence speed. In this embodiment, the formula (11) is further improved based on the DMPC, a decoupling control quantity $U(k)$ is first introduced into on a basis of the formula (11) expressed as follows:

$$X(k+1) = M(k) X(k) + W^{-1} U(k) \quad (12),$$

where $W = w \, \text{diag}(w_1, w_2, \ldots, w_n)$ represents a weight matrix of the BESS; $X_0 = [w_1^0, x_2^0, \ldots, x_n^0]^T$, where $x_n^0$ represents a state of a n-th BESU at an initial time, $X(k) = [x_1(k), x_2(k), \ldots, x_n(k)]^T$, where $x_n(k)$ is a state of the n-th BESU at a time k; and $X(k+1) = [x_1(k+1), x_2(k+1), \ldots, x_n(k+1)]^T$, where $x_n(k+1)$ is a state of an n-th BESU at a time k+1. The current time is set to be the time k, a prediction time domain is defined as $N_p$, a control time domain is defined as $N_c$, and $N_p \geq N_c$, and the decoupling control quantity $U(k)$ outside the control time domain $N_c$ remain unchanged. The control variable of the i-th node only acts on itself, and an updating formula of the i-th node is expressed as follows:

$$x_i(k+1) = M_{ii}(k) x_i(k) + \Sigma_{j \in N_i(k)} M_{ij}(k) x_j(k) + w_i^{-1} u_i(k) \quad (12a).$$

Taking the current time k as a starting point, the state vector $X_i(k)$ of the i-th node can be predicted in the prediction time domain based on the formula (12a) as a formula (13):

$$X_i(k) = F_i(k) x_i(k) + \Sigma_{j \in N_i(k)} F_{ij}(k) X_j(k) + G_i(k) U_i(k) \quad (13),$$

where $$X_i(k) = \begin{bmatrix} x_i(k+1/k) \\ x_i(k+2/k) \\ \vdots \\ x_i(k+N_p/k) \end{bmatrix},$$

$$F_{ij}(k) = \begin{bmatrix} M_{ij}(k) & 0 & \ldots & 0 \\ M_{ii}(k) M_{ij}(k) & M_{ij}(k) & \ldots & 0 \\ \vdots & \ddots & \ldots & \vdots \\ M_{ii}^{N_p-1}(k) M_{ij}(k) & M_{ii}^{N_p-2}(k) M_{ij}(k) & \ldots & M_{ij}(k) \end{bmatrix},$$

$$F_i(k) = \begin{bmatrix} M_{ii}(k) \\ M_{ii}^2(k) \\ \vdots \\ M_{ii}^{N_p}(k) \end{bmatrix},$$

$$G_i(k) = \begin{bmatrix} w_i^{-1} & & & \\ M_{ii}(k) w_i^{-1} & w_i^{-1} & & \\ \vdots & \ldots & \ddots & \\ M_{ii}^{N_p-2}(k) w_i^{-1} & M_{ii}^{N_p-2}(k) w_i^{-1} & \ldots & \sum_{c=0}^{N_p-N_c} M_{ii}^c(k) w_i^{-1} \end{bmatrix},$$

and $X_j(k) = x_j(k) I_{N_p}$, where $I_{N_p}$ represents a column vector whose elements are all 1.

A quadratic optimization objective function is defined as a formula (14):

$$\min J_i(k) = \|X_i(k) - H_i(k)\|_Q^2 + \|U_i(k)\|_R^2 \quad (14)$$

where $Q = q I_{N_p}$, $R = r I_{N_c}$, $q > 0$, $r > 0$; $H_i(k)$ represents a reference vector of the consensus variable, $H_i(k)$ and $U_i(k)$ are calculated as follows.

1) When $x_i(k) \in [\underline{x}_i, \bar{x}_i]$ is satisfied, $$H_i(k) \text{ is expressed as } H_i(k) = \begin{cases} \bar{x}'_i I_{N_p} & x_i(k) > \bar{x}_i \\ \underline{x}'_i I_{N_p} & x_i(k) < \underline{x}_i \end{cases}; \quad (15)$$

for the formula (14), a partial derivative of $U_i(k)$ is calculated and the partial derivative is made to be 0, so as to obtain an optimal decoupling control quantity, which is expressed as a formula (16):

$$\begin{cases} U_i(k) = \Psi_i(k)\left[H_i(k) - F_i(k) - \sum_{j \in N_i(k)} F_{ij}(k)X_j(k)\right] \\ \Psi_i(k) = (G_i^T(k)QG_i(k) + R)^{-1}(G_i^T(k)Q) \end{cases} \quad (16)$$

2) When $x_1(k) \in [\underline{x}_i, \overline{x}_i]$ is satisfied, $$U_i(k) \text{ is expressed as } U_i(k) = 0 \cdot I_{N_p} \quad (17),$$

so far, the calculation of $U_i(k)$ is completed, and then a first element $u_i(k)$ in $U_i(k)$ is taken and corrected for a second time. A correction formula is shown in a formula (18) expressed as:

$$u'_i(k) = \Sigma_{j \in N_i} a_{ij}(u_i(k) - u_j(k)) \quad (18).$$

The corrected control vector, i.e., the decoupling control quantity, $U_i(k) = [u'_1(k), u'_2(k), \ldots, u'_n(k)]^T$, is input into the formula (12) to complete the updating of the BESS. It can be seen that the above derivation process only needs to transfer a small amount of information between adjacent nodes, which is a completely distributed process.

S3, implementing of the distributed algorithm

To realize the grouped distributed coordination control of the BESS using the distributed algorithm, iterative initialization and the adjustment strategy of the adjacency matrix A are needed. Iterative initialization at the initial time of each control cycle is a necessary link to realize the distributed coordination control of the BESS, and the adjustment strategy of the adjacency matrix A is designed to realize the grouping coordinated control and improve the energy conversion efficiency of the BESU.

Step S31, initializing the BESS.

Specifically, after receiving a total load, i.e., a total output power, the distributed BESS needs to be initialized for the consensus iteration according to information of the received total output power, and then the consensus iteration can be carried out. $P_{bi}^0$ is defined as an initial power of the iterating in each control cycle of the BESU i and $x_i^0$ is an initial value of the consensus variable of the iterating in each control cycle of the BESU i. In order to reduce the communication cost between a superior energy management center and the BESS, it is assumed that the superior energy management center randomly sends the total output power $P_{BS}^{ref}(t)$ of the BESS to one BESU of the charging group $C_Z$ and one BESU of the discharging group $D_Z$ at a beginning of each control cycle.

1) defining an initial power $P_{bi}^0$ for iterating.

Specifically, the total output power of the BESS is defined as $P_{BS}^{ref}(t)$, one of the BESUs of the charging group $C_Z$ receives the total output power $P_{BS}^{ref}(t)$ when $P_{BS}^{ref}(t) \leq 0$, and one of the BESUs of the discharging group $D_Z$ receives the total output power $P_{BS}^{ref}(t)$ when $P_{BS}^{ref}(t) > 0$. Therefore, for the BESU i received the total output power $P_{BS}^{ref}(t)$, the initial power $P_{bi}^0$ is expressed as follows:

$$P_{bi}^0 = \begin{cases} P_{BS}^{ref}(t), & i \in C_Z \text{ and } P_{BS}^{ref}(t) \leq 0 \\ P_{BS}^{ref}(t), & i \in D_Z \text{ and } P_{BS}^{ref}(t) > 0 \\ 0, & \text{other conditions} \end{cases} \quad (19)$$

where the BESU i belongs only to the charging group $C_Z$ or the discharging group $D_Z$ at the time t, and the initial power $P_{bi}^0$ is 0 for the other BESUs that does not receive the total output power $P_{BS}^{ref}(t)$.

2) defining the initial state quantity $x_i^0$ for iterating, as per a formula (20) expressed as follows:

$$x_i^0 = w_i^{-1} P_{bi}^0 \quad (20).$$

After the BESU i determines its own value of the initial power $P_{bi}^0$, the initial state quantity for iterating is calculated according to an inverse transformation of the formula (1a) as follows:

$$x_i^0 = w_i^{-1} P_{bi}^0 \quad (20a).$$

Therefore, the initialization of the distributed BESS is expressed as:

$$\begin{cases} P_0(t) = [P_{b1}^0, P_{b2}^0, \ldots, P_{bn}^0]^T \\ X_0 = W^{-1} P_0(t) \end{cases} \quad (21)$$

Step S32, determining the adjustment strategy of the adjacency matrix A.

Specifically, a condition that the charging group $C_Z$ and the discharging group $D_Z$ of the BESS at an initial time of each control cycle are set to do not exchange information is set, that is, the BESU i and the dual unit BESU $i^0$ thereof correspond to $a_{ii^\circ} = 0$, while the charging group $C_Z$ and the discharging group $D_Z$ each are intragroup communicated as $C_Z(D_Z)$, and a corresponding adjacency matrix is an initial adjacency matrix $A_0$ expressed as follows:

$$A_0 = \begin{bmatrix} 0 & 1 & 0 & 1 & 0 & 0 & 0 & 0 \\ 1 & 0 & 1 & 0 & 0 & 0 & 0 & 0 \\ 0 & 1 & 0 & 1 & 0 & 0 & 0 & 0 \\ 1 & 0 & 1 & 0 & 0 & 0 & 0 & 0 \\ 0 & 0 & 0 & 0 & 0 & 1 & 0 & 1 \\ 0 & 0 & 0 & 0 & 1 & 0 & 1 & 0 \\ 0 & 0 & 0 & 0 & 0 & 1 & 0 & 1 \\ 0 & 0 & 0 & 0 & 1 & 0 & 1 & 0 \end{bmatrix}.$$

The adjacency matrix A of the BESS at the initial time of iterating of each control cycle is expressed as $A = A_0$, and the adjacency matrix A changes with iteration times k. The following adjustment strategy of the adjacency matrix A is designed to solve intergroup coordination and avoid the low energy conversion efficiency caused by the low operating power of the BESUs.

1) Responding to the Intergroup Coordination.

Specifically, $k_c$ is defined as a positive integer and $X_0$ is substituted into the formula (12) for iterating. When a $k_c$-th time of iterating is ended, the BESU i can determine the total output power $P_{BS}^{ref}(t)$ of the BESS at this time exceeds a total response capacity of the group where the BESU i is located in response to the state $x_i(k_c)$ of the BESU i still does not meet the state constraint, and the dual group is requested to participate in consumption and let $a_{ii^\circ} = 1$. Otherwise let $a_{ii^\circ} = 0$ and continue to iterating until reaching the convergence accuracy. The adjacency matrix A is adjusted according to a formula (22) to achieve the intergroup coordination:

$$\begin{cases} a_{ii^\circ} = 1 & x_i(k_c) \notin [\underline{x}_i, \overline{x}_i] \\ a_{ii^\circ} = 0 & x_i(k_c) \in [\underline{x}_i, \overline{x}_i] \end{cases}, \quad (22)$$

where $\underline{x}_i$ and $\overline{x}_i$ respectively represent a lower limit and an upper limit of a state constraint of the BESU i as an i-th node, $x_i(k_c)$ represents a state of a consensus variable of the i-th node at a time $k_c$, $a_{ii^\circ}$ represents an element in the adjacency matrix A, $a_{ii^\circ} = 1$ represents that the BESU i exchanges data with the BESU $i^\circ$ being a dual unit of the BESU i, and $a_{ii^\circ} = 0$ represents there is no data exchange.

2) Improving the Energy Conversion Efficiency of the BESUs.

For the BESU i with an initial power of $P_{bi}^0 = P_{BS}^{ref}(t)$, the BESU i does not exchange information with its adjacent nodes when a formula (23) is satisfied, and only the BESU i bears by the BESU i, that is, $P_{bi}(t) = P_{BS}^{ref}(t)$. Otherwise, continue iterating. The formula (23) is expressed as follows:

$$|P_{Bi}^0| \leq 2\zeta P_{bn,i} \tag{23}$$

where $\zeta \in (0,1)$, $P_{bn,i}$ is a rated power of the BESU i.

For $\forall i \in \mathbb{Z}_n$, when the k-th iteration result has reached a certain convergence accuracy and the power $P_{bi}^k$ corresponding to $x_i(k)$ (see the formula (1a)) satisfies the formula (24), then the BESU i exits the communication iteration of a current control cycle. In this situation, the BESS needs to be adjusted as shown in a formula (25). Otherwise, no adjustment will be made and the iteration will continue until reaching the convergence accuracy. The formula (24) and the formula (25) are respectively expressed as follows:

$$0 < |P_{bi}^k| \leq \zeta P_{bn,i}, \tag{24}$$

$$\begin{cases} x'_j(k) = x_j(k) + \dfrac{x_i(k)w_i}{d_i(k-1)w_j} \\ x'_i(k) = 0 \\ a_{ij} = 0 \\ d'_j(k) = d_j(k) - 1 \end{cases} \forall j \in N_i(k-1), \tag{25}$$

where $a_{ij}$ represents an element in the adjacency matrix A representing a communication network topology, $x_i(k)$ represents a state of the i-th node at the time k, $x_j(k)$ represents a state of a j-th node at the time k, $w_i$ represents a weight coefficient of the BESU i, $w_j$ represents a weight coefficient of a BESU j, $N_i(k-1)$ represents an adjacent node set of the BESU i before exits, $x'_j(k)$ represents a state quantity of the j-th node in $N_i(k-1)$ after the BESU i exits, and $d'_j(k)$ represents the number of adjacent nodes of the j-th node in $N_i(k-1)$ after the BESU i exits. As can be seen from the formula (25), before and after the i-th node exits, there are:

$$\Sigma_{j \in N_i(k-1) \cup \{i\}} w_j x'_j(k) = \Sigma_{j \in N_i(k-1) \cup \{i\}} w_j x_j(k) \tag{26}$$

Therefore, the consensus algorithm proposed by the disclosure can ensure that the k-th iteration result of the BESS satisfies a formula (27), so as to ensure that a sum of final power allocations of the multiple BESUs is equal to the total output power $P_{BS}^{ref}(t)$ of the BESS. The formula (27) is expressed as follows:

$$\Sigma_{i \in \mathcal{Z}_n} w_i x_i(0) = \Sigma_{i \in \mathcal{Z}_n} w_i x_i(k) \tag{27}$$

To sum up, at the beginning of each control cycle, each BESU in the BESS is initialized according to the above method, the initial state value $X_0$ is substituted into the formula (12), the convergence accuracy is set, and a convergence state value $X^*$ that satisfies the power constraints of all the n number of nodes can be obtained according to the above method and strategy. Then, the power $P_{bi}(t)$ of each BESU is calculated by using a formula (28) as follows:

$$\begin{cases} P(t) = WX^* \\ P(t) = [P_{b1}(t), P_{b2}(t), \ldots, P_{bn}(t)]^T, \\ P_B(t) = \sum_{i=1}^n P_{bi}(t) \end{cases} \tag{28}$$

where $X^*$ represents the convergence state value that satisfies the power constraints of all the n number of nodes, $W = w \, \text{diag}(w_1, w_2, \ldots, w_n)$ represents the weight matrix of the BESS, $P_B(t)$ represents a sum of the powers of all the n number of BESUs, and the power of the BESU i.

The power allocation of each BESU in the BESS in this control cycle is completed through the distributed algorithm. When the SOC of any group of BESUs reaches the set SOC upper or lower limits for switching charging/discharging states during operation, the state switching of the charge/discharging group is triggered, that is, the original charging group $C_Z$ is changed into the discharging group $D_Z$, and the original discharging group $D_Z$ is changed in the charging group $C_Z$.

Verification of the Feasibility of the Method

Specifically, the advantages of the proposed method are demonstrated from two aspects including algorithm performance and control effect. The parameters of the BESS and the algorithm are shown in Table 1 as follows.

TABLE 1

| Energy storage system parameters | | Algorithm parameters | |
|---|---|---|---|
| Parameters | Numerical value | Parameters | Numerical value |
| BESU quantity | n = 8 | Convergence coefficient | ε = 0.1 |
| BESU rated power/(kW) | $P_{bn}$ = 10 | Convergence accuracy | $10^{-4}$ |
| BESU rated capacity/(kW · h) | $E_{ba}$ = 40 | Prediction time domain $N_p$ | $N_p$ = 5 |
| Upper and lower limits of SOC $SOCmin_{max}$ | 0.9/0.1 | Control time domain $N_c$ | $N_c$ = 3 |
| Upper and lower thresholds of SOC of charging/discharging states switching | 0.88/0.122 | $\zeta$ | $\zeta$ = 0.2 |

1) Algorithm Performance

The experiment may include two parts. Firstly, an energy storage system with four energy storage units is taken as an example, the classical weighted-consensus algorithm and the algorithm proposed in this paper are compared and analyzed. Secondly, another energy storage system with 8 energy storage units is taken as an example, the adjustment strategy of the adjacency matrix proposed in the S32 is analyzed to verify the advantages of the algorithm proposed in this paper.

Figure 2A:
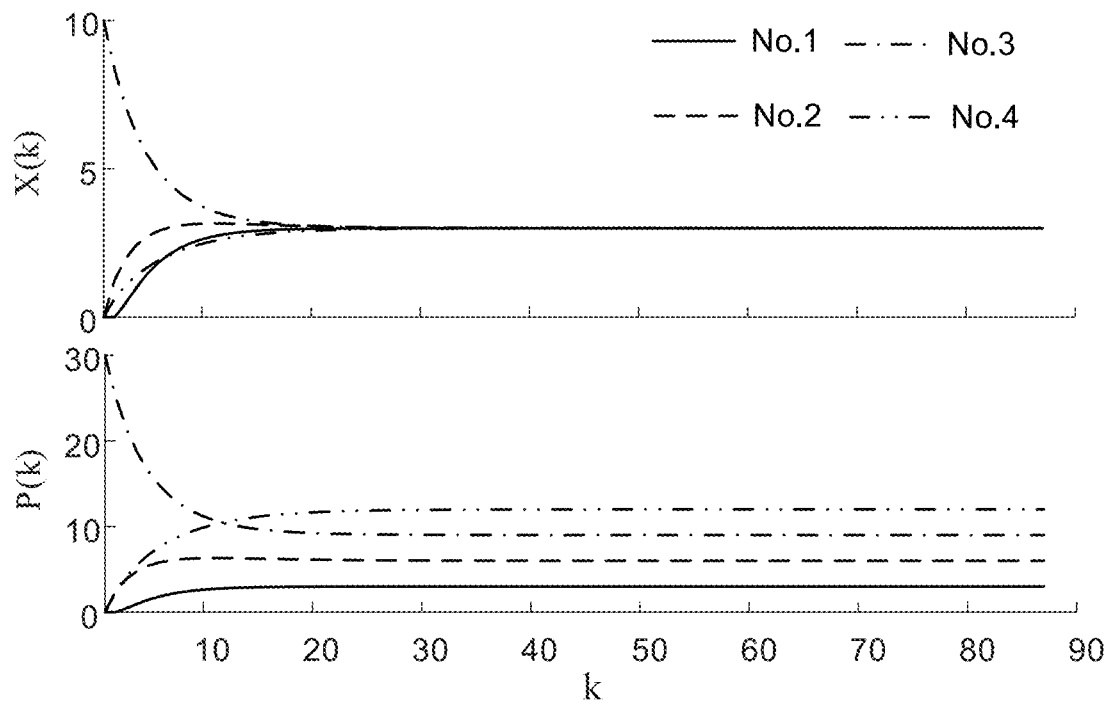
FIG. 2a illustrates a schematic diagram of an iterative convergence process of a classical weighted-consensus algorithm.
Figure 2B:
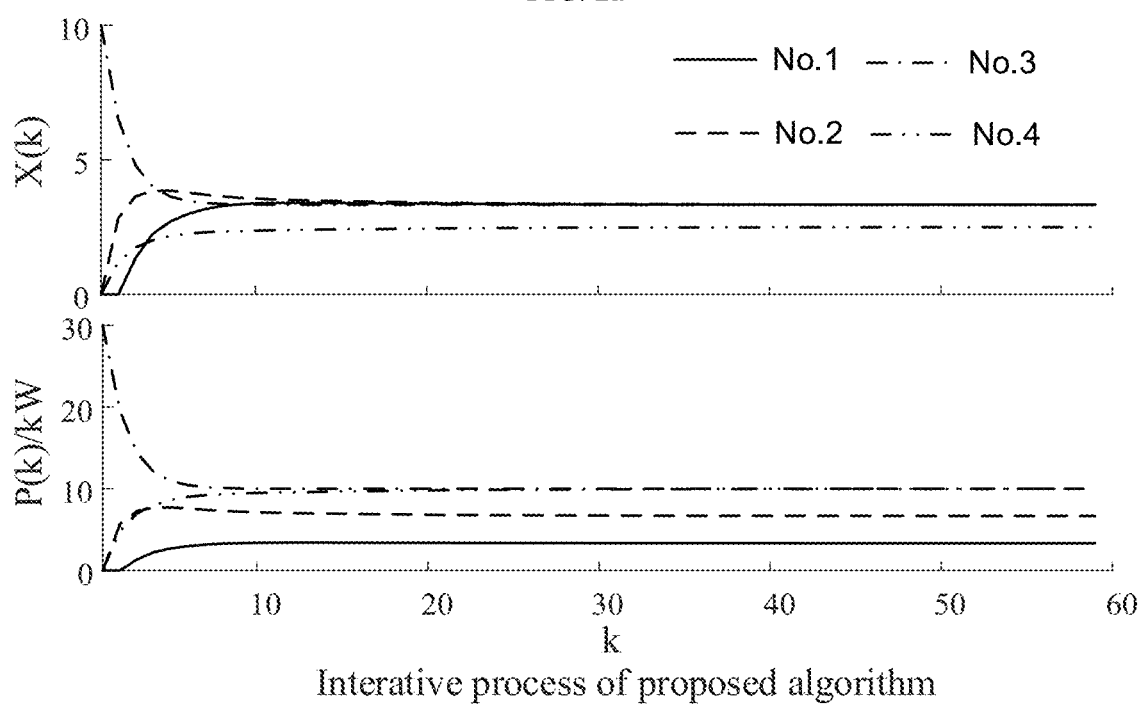
FIG. 2b illustrates a schematic diagram of an iterative convergence process of a target algorithm according to an embodiment of the disclosure.

The energy storage system with four energy storage units (where the communication topology is ring-shaped) as an example, a discharge weight matrix of the time t is defined as $W = \text{diag}(1, 2, 3, 4)$, and the total output power $P_{BS}^{ref}(t) = 30$ kW is sent to No. 3 energy storage unit by the superior energy management center. The iterative initialization of the classical weighted-consensus algorithm and the algorithm in this paper are $P_0 = [0,0,30,0]^T$ and $X_0 = [0,0,10,0]^T$. FIG. 2a illustrates an iterative convergence process of the classical weighted-consensus algorithm, and the convergence result is $P(t) = [3,6,9,12]^T$. FIG. 2b illustrates an iterative process of the algorithm proposed in this paper, and the power allocation result is: $P(t) = [3.3333, 6.6667, 10, 10]^T$.

Figure 3:
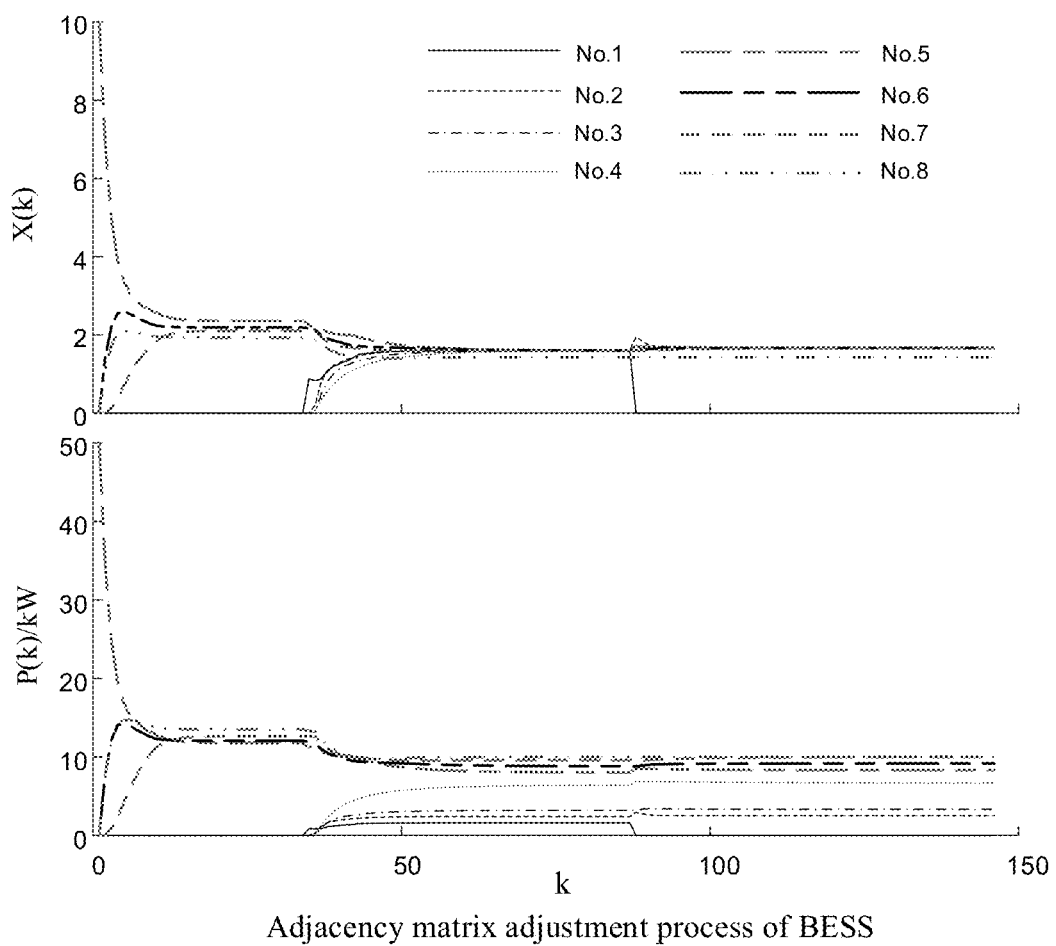
FIG. 3 illustrates a schematic diagram showing iterative convergence processes obtained by battery energy storage units (BESUs) of the BESS using an adjustment strategy of an adjacency matrix A according to an embodiment of the disclosure.
Figure 10:
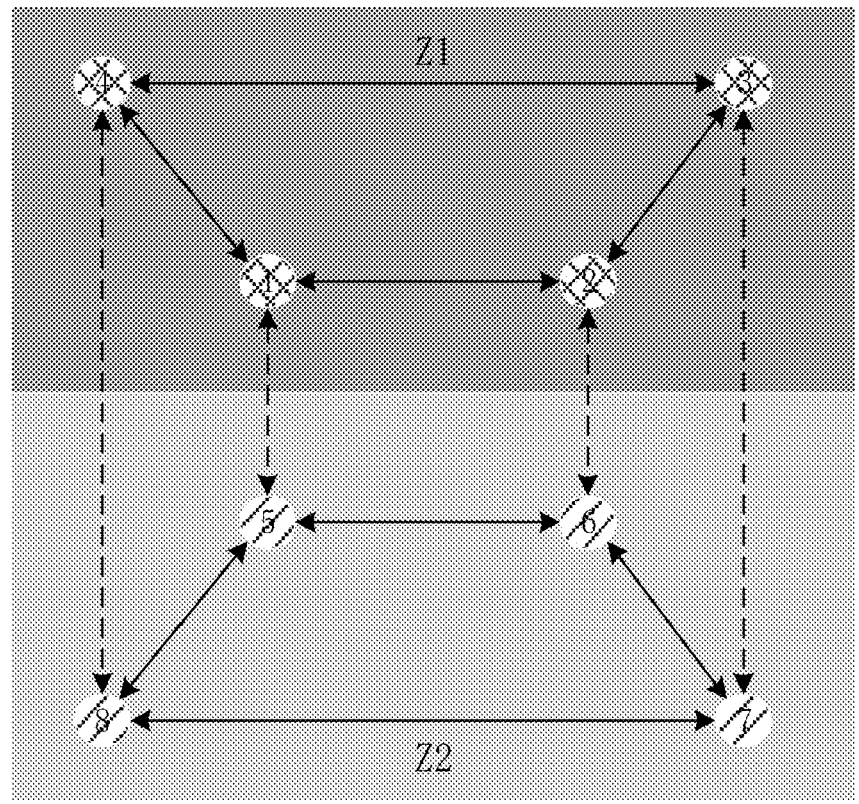
FIG. 10 illustrates a topological diagram of the BESUs of the BESS of the disclosure.

The adjustment strategy of the adjacency matrix A is analyzed by using the battery energy storage unit system with eight energy storage units. The eight energy storage units are divided into two groups Z1 and Z2, the group Z1 is composed of energy storage units from No. 1 through No. 4, the group Z2 is composed of energy storage units from No. 5 through No. 8, and the group Z1 is the charging group and the group Z2 is the discharging group. The communication topology of the energy storage system is shown in FIG. 10, where $\zeta = 0.2$. The discharge weight matrix of the energy storage system at the time t as: W=diag(1, 1.5, 2, 4, 5, 5.5, 6, 7), and the $P_{BS}^{ref}(t)=50$ kW is sent to No. 5 energy storage unit in response to a demand by the microgrid center. Iteration initialization is expressed as: $P_0=[0,0,0,0,50,0,0,0]^T$ and $X_0=[0,0,0,0,10,0,0,0]^T$. The iterative convergence process is shown in FIG. 3.

2) Control effect of BESS grouping strategy

Figure 5:
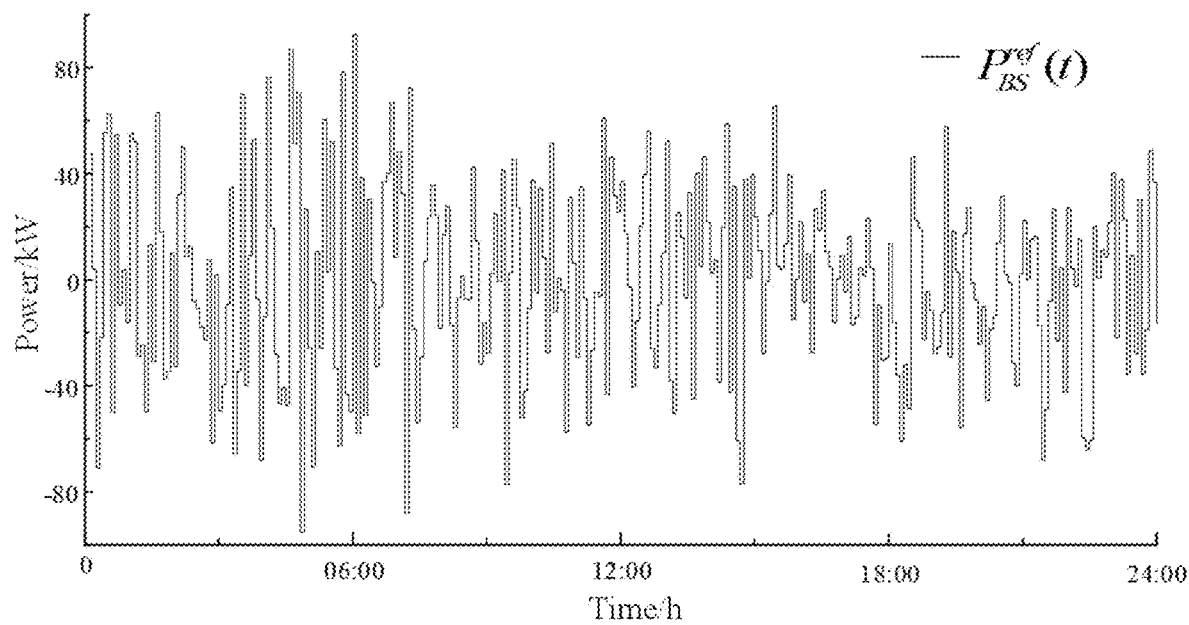
FIG. 5 illustrates a schematic diagram showing regulation demand power curves of an energy storage system in a dispatching cycle of the grid-connected microgrid according to an embodiment of the disclosure.

Specifically, the control effect of this method is analyzed and compared with the control effect of traditional non-grouping strategies (mainly including maximum power allocation strategy and proportional allocation strategy) through this experiment. A grid-connected microgrid with wind charge storage and solar charge storage is built as shown in FIG. 4. In the microgrid model, the parameters of the distributed energy storage system are shown in the Table 1, and the communication topology is shown in FIG. 10. In the energy storage system, The BESUs from No. 1 through No. 4 form the group Z1, and the BESUs from No. 5 through No. 8 form the group Z2. The source load data comes from an experimental microgrid platform, and a sampling period is 5 minutes. In this scenario, due to the large vitality of new energy and load power, in order to reduce the adverse impact of microgrid on large power grid, it is necessary to use energy storage to smooth the grid-connected tie-line power. The group Z1 is set as the charging group and the group Z2 as the discharging group at the initial time, and the initial SOC of the BESUs from No. 1 through No. 8 is (0.2, 0.25, 0.3, 0.35, 0.65, 0.7, 0.75, 0.8). A curve of the total power $P_{BS}^{ref}(t)$ of the energy storage system in a scheduling period of the microgrid to cycle is shown in FIG. 5.

Figure 6:
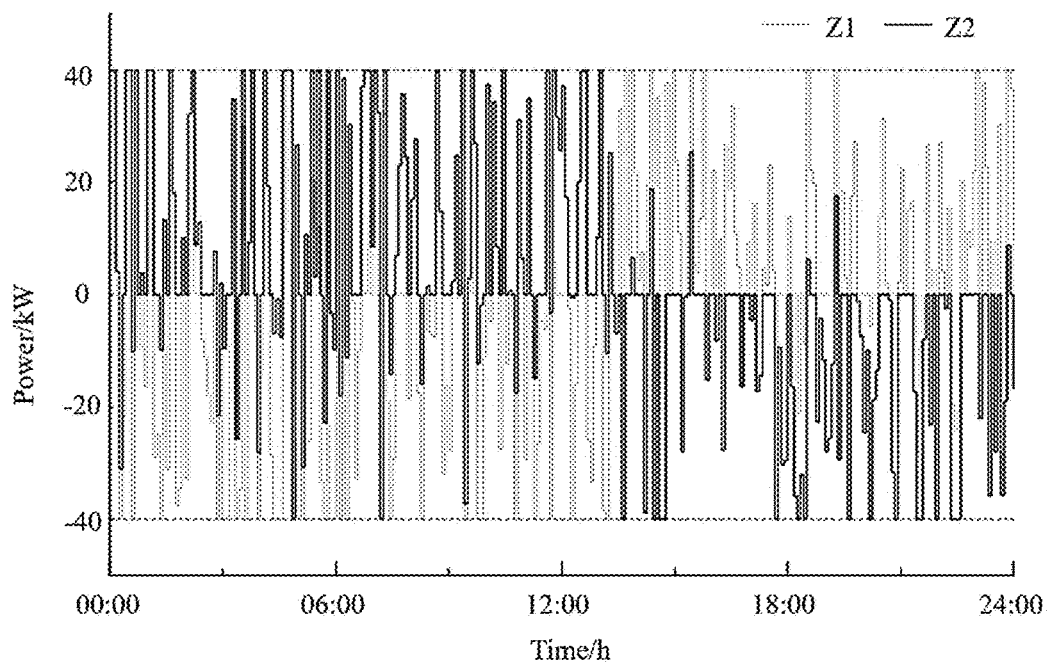
FIG. 6 illustrates a schematic diagram showing power curves of a group Z1 and a group Z2 under a control strategy of according to an embodiment of the disclosure.
Figure 7:
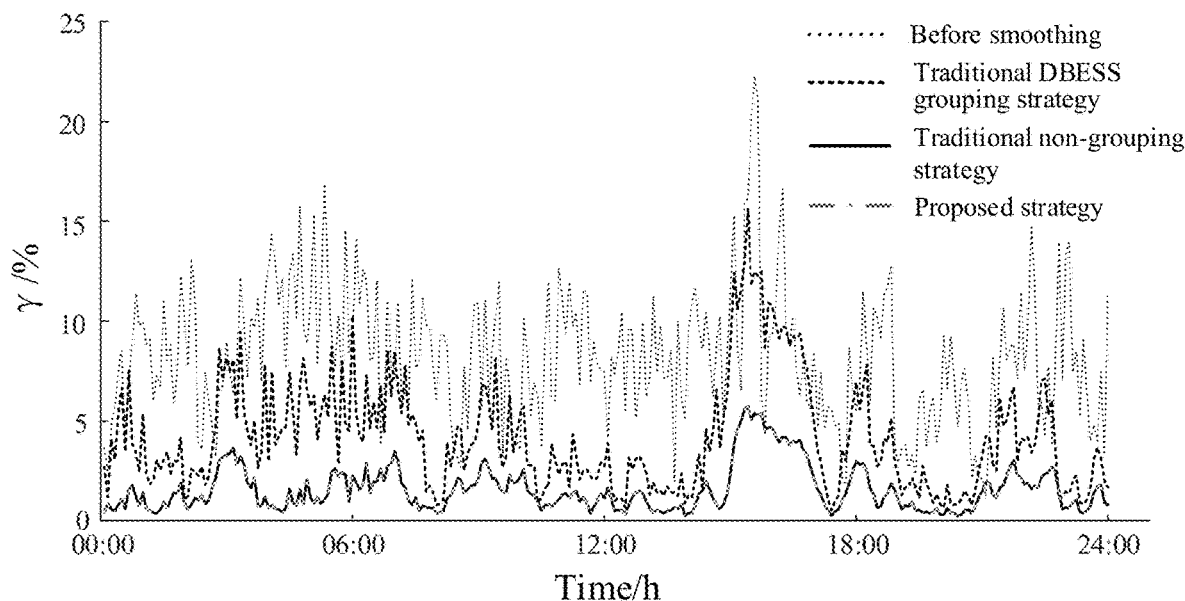
FIG. 7 illustrates a comparison diagram of grid-connected power volatility under different allocation strategies.
Figure 8:
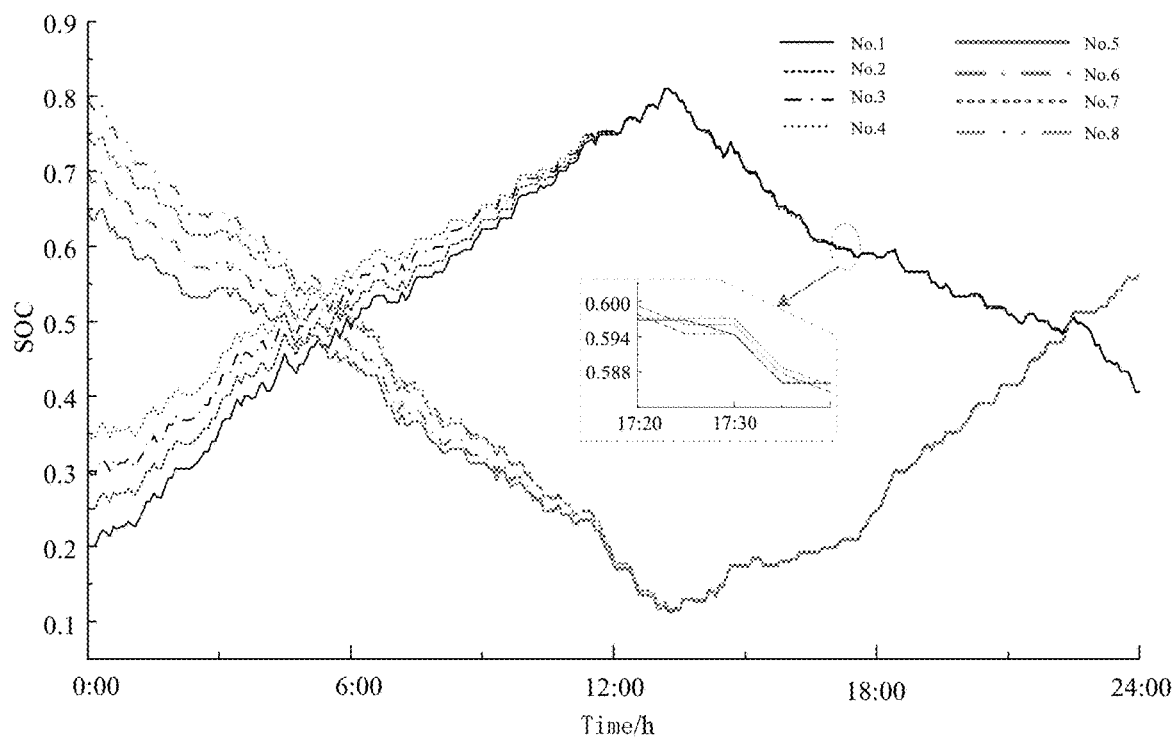
FIG. 8 illustrates a schematic diagram showing state of charge (SOC) change curves of the BESUs within 24 hours.

Under the grouping control strategy in this paper, power curves of the group Z1 and the group Z2 are shown in FIG. 6. In order to demonstrate the smoothing effect of the grouping control strategy in this paper on the grid-connected power fluctuation, the restriction condition of the microgrid grid-connected power fluctuation rate γ is γ≤7% within 30 minutes. Under this restriction condition, the strategy proposed in the disclosure, the traditional non-grouping strategy and traditional DBESS (double battery energy storage system) strategy are statistically compared in one scheduling period, and statistical results are shown in FIG. 7. In addition, SOC change curves of respective BESUs within 24 hours under the strategy proposed in the disclosure is shown in FIG. 8.

Figure 9:
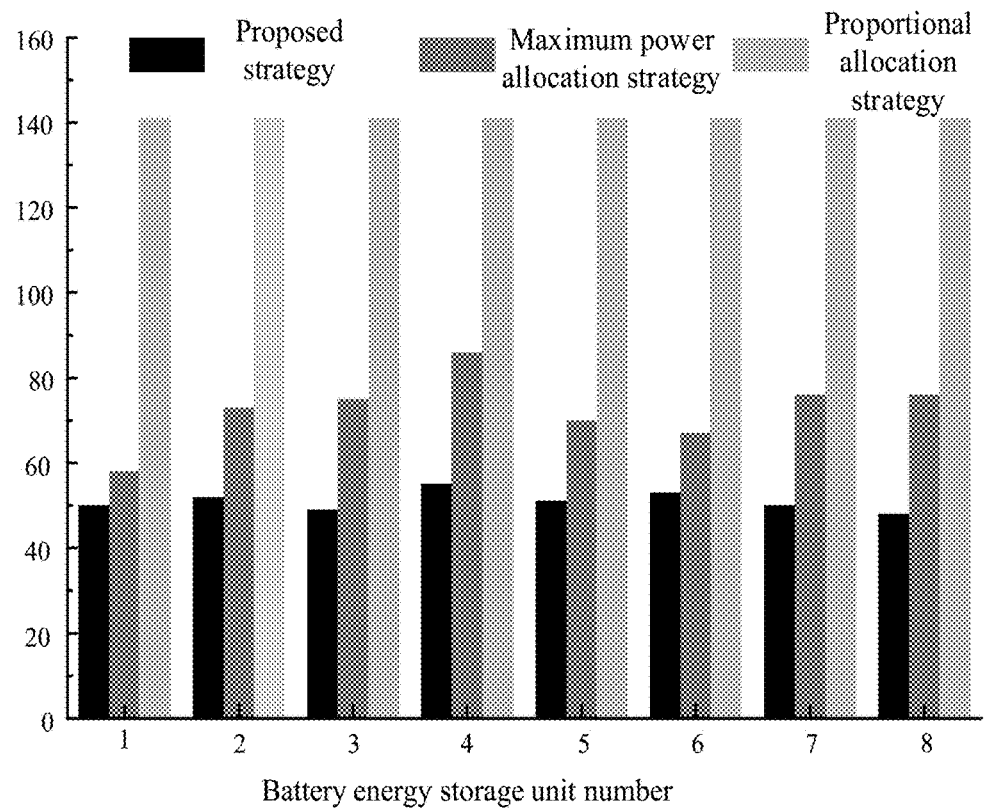
FIG. 9 illustrates a comparison diagram of switching times of charging/discharging states with different distribution strategies.

In order to demonstrate the effectiveness of the proposed strategy in reducing the switching times of charging/discharging states of BESUs, the change of power symbols of BESUs at adjacent moments is defined as one switching of charging/discharging states, and the switching times of charging/discharging states of each BESU in one scheduling period under the proposed strategy, the maximum power allocation strategy in the non-grouping strategy and the proportional allocation strategy are counted respectively. The statistical results are shown in FIG. 9. In addition, in order to verify the effectiveness of the proposed strategy in this paper to improve the efficiency, the number of low-power operations of all BESUs under different strategies is counted here. The operating state of the BESU with operating power $0<|P_b(t)|\leq 0.2\ P_{bn}$ is defined as a low-power and low-efficiency operation with reference to relevant research. The times of BESU operating power less than $0.2\ P_{bn}$ under different strategies are compared, and the proportion of low-power operation is calculated. The statistical results of the low-power operation times per 24 hours of the BESU under different allocation strategies are shown in Table 2:

TABLE 2

| Power allocation strategy | | Low-power operation times | | Total operation times | | Low-power operation ratio |
| --- | --- | --- | --- | --- | --- | --- |
| | | Total times of eight BESUs | Average times | Total times of eight BESUs | Average times | |
| Proposed strategy | | 23 | 2.875 | 1301 | 162.625 | 1.77% |
| Non-strategy grouping | Maximum power allocation | 64 | 8 | 983 | 122.875 | 6.51% |
| | Proportional allocation | 779 | 97.375 | 2304 | 288 | 33.81% |

Through the above two experiments, this study draws the following conclusions:

1) Firstly, because the classical consensus algorithm does not consider the constraints, the phenomenon that the power of the energy storage unit with larger weight exceeds the limit occurs, while the consensus algorithm proposed in this paper considers the power constraints and improves the convergence speed of the algorithm based on DMPC. Therefore, the power allocation results of the algorithm in this paper meet the constraints and the principle of "capable people do more work", and the convergence speed of the algorithm in this paper is faster than that of the classical consensus algorithm. In addition, the adjacency matrix adjustment strategy proposed in this paper can realize the intergroup coordination of the energy storage units. When the total regulation demand is greater than the regulation capacity of a single group, the unit of the dual group also participate in the regulation, so as to give full play to the regulation capacity of the energy storage system, overcome the shortcomings of insufficient power capacity of the energy storage system under the traditional DBESS grouping control strategy, and avoid multiple energy storage units running at low-power conditions at the same time, to thereby improve the energy conversion efficiency of the BESUs.

2) FIG. 6 illustrates power curves of the group Z1 and the group Z2. At about 13:00, the states of the two groups of batteries switch, that is, the Z1 group changes from a charging state to a discharging state, and the Z2 group changes from a discharging state to a charging state. For the color overlapping part in FIG. 6, due to the violent fluctuation of new energy power in these periods, the response demand for BESS is greater than the rated power of a single group, and both groups of batteries will participate in the response. From the volatility shown in FIG. 7, it can be seen that the smoothing results of the grouping strategy in this paper meet the volatility constraints and can effectively smooth the grid-connected power fluctuation. FIG. 8 illustrates SOC change curves of respective energy storage units within 24 hours. Based on comprehensive analysis of FIG.

6, FIG. 7 and FIG. 8, it can be seen that the grouping strategy in this paper has advantages as follows. Firstly, the capacity utilization of respective BESUs is improved. Secondly, the BESUs in the same group can be in the same charging/discharging state for a long time, so that the orderliness of the charging/discharging behavior of each BESU is improved, and the frequent conversions of the charging/discharging state in the operation process of the BESUs is avoided. Thirdly, the SOC states of the BESUs in the same group tend to be consistent by adopting consensus control, so that individual BESUs are prevented from being unable to participate in response when entering extreme conditions, and the power response capability of the energy storage system is ensured.

The statistical results in FIG. 9 show that the average charging/discharging conversion times of energy storage units in the proposed strategy, the maximum power allocation strategy and the proportional allocation strategy are 51, 76 and 141 times respectively in a scheduling period. The switching times of charging/discharging states of the proposed strategy are 67% of the maximum power allocation strategy and 36% of the proportional allocation strategy. Moreover, the switching times of charging/discharging states of each BESU in the proposed strategy are relatively uniform, which is helpful to prevent the rapid decline of the life of individual units and to prolong the cycle life of BESS. The experimental results shown in the Table 2 show that the BESU operates at low power less than 3 times on average in 288 control cycles a day under the proposed strategy, and the low power operation rate is 4.74% less than that of the maximum power allocation strategy and 32.04% less than that of the proportional allocation strategy. The control strategy proposed in this paper optimizes the operating state of BESU, reduces the power loss of BESU, and improves the energy conversion efficiency of BESU.

Through this research, this paper finds that the following effects can be achieved by grouping and distributed consensus control of multiple energy storage units. Firstly, the switching times of charging/discharging states of energy storage units are reduced and the service life of energy storage is prolonged. Secondly, the times of low-power operation of energy storage unit are reduced and the efficiency of energy storage operation is improved. Thirdly, the consensus of each unit in the energy storage system is improved and the regulation capability of the energy storage system is improved. Fourthly, the distributed control of energy storage system is realized and the advantages of distributed control are fully played. It provides a reference idea for the application of energy storage technology. In addition, the proposed weighted-consensus algorithm based on DMPC and consensus variable constraints effectively improves the convergence speed of the algorithm and ensures that the power allocation results meet the power constraints of each energy storage unit.

The above mentioned is only preferred specific embodiments of the disclosure, but the scope of protection of the disclosure is not limited to this. Any changes or substitutions that can be easily thought of by those skilled in the related art within the technical scope disclosed in the disclosure shall be covered by the scope of protection of the disclosure. Therefore, the scope of protection of the disclosure should be subject to the scope of protection of the claims.

What is claimed is:

1. A grouped consensus power allocation method for multiple energy storage units, comprising:
   determining a grouped coordination control strategy of multiple battery energy storage units (BESUs), wherein a battery energy storage system (BESS) comprises the multiple BESUs, the multiple BESUs are communicated through a communication topology, and the multiple BESUs are grouped into a charging group $C_Z$ and a discharging group $D_Z$; and
   performing power coordination control between the charging group $C_Z$ and the discharging group $D_Z$ based on a distributed algorithm, and determining whether a switching between the charging group $C_Z$ and the discharging group $D_Z$ is triggered during an operation process of the BESS;
   wherein the performing power coordination control between the charging group $C_Z$ and the discharging group $D_Z$ based on a distributed algorithm comprises:
   step S31, initializing the BESS; and
   step S32, determining an adjustment strategy of an adjacency matrix A, comprising:
      determining, by a BESU i, whether a dual group is needed to participate in a process of iterating, and adjusting the adjacency matrix A through a formula (22) to achieve intergroup coordination in response to the dual group is needed to participate, wherein the formula (22) is expressed as follows:

$$\begin{cases} a_{ii^\circ} = 1 & x_i(k_c) \notin [\underline{x}_i, \overline{x}_i] \\ a_{ii^\circ} = 0 & x_i(k_c) \in [\underline{x}_i, \overline{x}_i] \end{cases}, \quad (22)$$

where $\underline{x}_i$ and $\overline{x}_i$ respectively represent a lower limit and an upper limit of a state constraint of the BESU i as an i-th node, $x_i(k_c)$ represents a state of a consensus variable of the i-th node at a time $k_c$, $a_{ii^\circ}$ represents an element in the adjacency matrix A, $a_{ii^\circ}=1$ represents that the BESU i exchanges data with the BESU i° being a dual unit of the BESU i, otherwise, there is no data exchange;

determining whether the BESU i with an initial power of $P_{bi}^0 = P_{BS}^{ref}(t)$ exits a communication iteration of a current control cycle, and adjusting the BESS as per a formula (25) in response to it is determined that the BESU i with the initial power exits the communication iteration, otherwise continuing to iterating without the adjusting until reaching a convergence accuracy, wherein the formula (25) is expressed as follows:

$$\begin{cases} x'_j(k) = x_j(k) + \dfrac{x_i(k)w_i}{d_i(k-1)w_j} \\ x'_i(k) = 0 \\ a_{ij} = 0 \\ d'_j(k) = d_j(k) - 1 \end{cases} \forall j \in N_i(k-1) \quad (25)$$

where $a_{ij}$ represents an element in the adjacency matrix A representing a communication network topology, $x_i(k)$ represents a state of the i-th node at a time k, $x_j(k)$ represents a state of a j-th node at the time k, $w_i$ represents a weight coefficient of the BESU i, $w_j$ represents a weight coefficient of a BESU j, $N_i(k-1)$ represents an adjacent node set of the BESU i before exits, $x_j'(k)$ represents a state quantity of the j-th node in $N_i(k-1)$ after the BESU i exits, and $d_j'(k)$ represents the number of adjacent nodes of the j-th node in $N_i(k-1)$ after the BESU i exits; and calculating a power $P_{bi}(t)$ of each of the multiple BESUs as per a formula (28) in response to the convergence accuracy is reached, wherein the formula (28) is expressed as follows:

$$\begin{cases} P(t) = WX^* \\ P(t) = [P_{b1}(t), P_{b2}(t), L, P_{bi}(t)L, P_{bn}(t)]^T \\ P_B(t) = \sum_{i=1}^{n} P_{bi}(t) \end{cases} \quad (28)$$

where $X^*$ represents a convergence state value meeting power constraints of all the n number of nodes, $W=\text{diag}(w_1, w_2, \ldots, w_n)$ represents a weight matrix of the BESS, $P_B(t)$ represents a sum of powers of all the multiple BESUs, and $P_{bi}(t)$ represents the power of the BESU i.

2. The method according to claim 1, wherein the determining whether a switching between the charging group $C_Z$ and the discharging group $D_Z$ is triggered comprises:
switching charging/discharging states of the charging group $C_Z$ and the discharging group $D_Z$, in response to a state of charge (SOC) of any one group of the BESUs reaches an upper threshold or a lower threshold.

3. The method according to claim 2, wherein the charging group $C_Z$ and the discharging group $D_Z$ are defined as mutual dual groups;
wherein a BESU i of the charging group $C_Z$ and a BESU i° of the discharging group $D_Z$ are mutual dual units when the BESU i and the BESU i° meet a direct intergroup physical communication condition, where $i \in \{1, 2 \ldots, n\}$, $i° \in \{1, 2 \ldots, n\}$, and n is the number of the BESUs in the charging group $C_Z$.

4. The method according to claim 1, wherein the step S31 comprises:
1) defining a total output power of the BESS as $P_{BS}^{ref}(t)$ and an initial power for iterating of the BESU i as $P_{bi}^0$; wherein one of the BESUs of the charging group $C_Z$ receives the total output power $P_{BS}^{ref}(t)$ when $P_{BS}^{ref}(t) \leq 0$, and one of the BESUs of the discharging group $D_Z$ receives the total output power $P_{BS}^{ref}(t)$ when $P_{BS}^{ref}(t) > 0$, thereby, for the BESU i received the total output power $P_{BS}^{ref}(t)$, the initial power $P_{bi}^0$ is expressed as follows:

$$P_{bi}^0 = \begin{cases} P_{BS}^{ref}(t), & i \in C_Z \text{ and } P_{BS}^{ref}(t) \leq 0 \\ P_{BS}^{ref}(t), & i \in D_Z \text{ and } P_{BS}^{ref}(t) > 0 \\ 0, & \text{other conditions} \end{cases} \quad (19)$$

where the BESU i belongs only to the charging group $C_Z$ or the discharging group $D_Z$ at a time t, and the initial power $P_{bi}^0$ is 0 for the other BESUs that do not receive the total output power $P_{BS}^{ref}(t)$;

2) Defining an initial state quantity for iterating, as per a formula (20) expressed as follows:

$$x_i^0 = w_i^{-1} P_{bi}^0 \quad (20),$$

where $P_{bi}^0$ represents the initial power for iterating of each control cycle of the BESU i, and $x_i^0$ represents an initial value of the consensus variable of each control cycle of the BESU i;
wherein the initializing the BESS is expressed as follows:

$$\begin{cases} P_0(t) = [P_{b1}^0, P_{b2}^0, \ldots, P_{bn}^0]^T \\ X_0 = W^{-1} P_0(t) \end{cases} \quad (21)$$

5. The method according to claim 1, wherein before the step S32, the method further comprises:
obtaining the adjacency matrix A, comprising:
making the charging group $C_Z$ and the discharging group $D_Z$ of the BESS at an initial time of each control cycle do not exchange information, that is, the BESU i and the dual unit BESU i° thereof correspond to $a_{ii°}=0$, while the charging group $C_Z$ and the discharging group $D_Z$ each are intragroup communicated, and a corresponding adjacency matrix is an initial adjacency matrix $A_0$ expressed as follows:

$$A_0 = \begin{bmatrix} 0 & 1 & 0 & 1 & 0 & 0 & 0 & 0 \\ 1 & 0 & 1 & 0 & 0 & 0 & 0 & 0 \\ 0 & 1 & 0 & 1 & 0 & 0 & 0 & 0 \\ 1 & 0 & 1 & 0 & 0 & 0 & 0 & 0 \\ 0 & 0 & 0 & 0 & 0 & 1 & 0 & 1 \\ 0 & 0 & 0 & 0 & 1 & 0 & 1 & 0 \\ 0 & 0 & 0 & 0 & 0 & 1 & 0 & 1 \\ 0 & 0 & 0 & 0 & 1 & 0 & 1 & 0 \end{bmatrix},$$

expressing the adjacency matrix A of the BESS at the initial time of iterating of each control cycle as $A=A_0$, wherein the adjacency matrix A changes with iteration times k.

6. The method according to claim 1, wherein the determining, by a BESU i, whether a dual group is needed to participate in a process of iterating comprises:
defining the $k_c$ as a positive integer, substituting $X_0$ into a formula (12) for iterating:

$$X(k+1)=M(k)X(k)+W^{-1}U(k) \quad (12)$$

where M(k) represents a non-negative row random matrix, U(k) represents a decoupling control quantity; wherein $X_0=[x_1^0, x_2^0, \ldots, x_n^0]^T$, where $x_n^0$ is a state of an n-th BESU at the initial time; $X(k)=[x_1(k), x_2(k), \ldots, x_n(k)]^T$, where $x_n(k)$ is a state of the n-th BESU at the time k; and $X(k+1)=[x_1(k+1), x_2(k+1), \ldots, x_n(k+1)]^T$, where $x_n(k+1)$ is a state of the n-th BESU at a time k+1;
when a $k_c$-th time of iterating is ended, determining, by a BESU i, the total output power $P_{BS}^{ref}(t)$ of the BESS at this time exceeds a total response capacity of the group where the BESU i is located in response to the state $x_i(k_c)$ of the BESU i still does not meet the state constraint, requesting the dual group to participate in consumption and letting $a_{ii°}=1$; otherwise letting $a_{ii°}=0$ and continuing to iterating until reaching the convergence accuracy.

7. The method according to claim 6, further comprising:
setting the state constraint, comprising:
setting a state of the consensus variable of the i-th node at the time k as $x_i(k)$ in considering of the BESS with n numbers of agent nodes; wherein the state constraint of the consensus variable of the i-th node is expressed as follows:

$$x_i(k) \in [\underline{x}_i, \overline{x}_i],$$

where $[\underline{x}, \overline{x}]$ represents an intersection of constraints of all the n number of nodes, $[\underline{x},\overline{x}]=I_{i=1}^n[\underline{x}_i,\overline{x}_i]$, and $x_i$ represents a power related quantity;
introducing a variable $r_{ij}(k)$ on a basis of an ordinary weighted-consensus algorithm to realize that a distributed power coordinated allocation result meets power constraints of the respective BESUs, wherein an iterating and updating method of the consensus variable is expressed by a formula (1) as follows:

$$x_i(k+1) = x_i(k) + \varepsilon w_i^{-1} \sum_{j \in N_i(k)} r_{ij}(k) a_{ij} \cdot (x_j(k) - x_i(k)), \forall i \in \mathfrak{c}_n, \quad (1)$$

where ε represents a convergence coefficient and ε>0; for an undirected graph, $a_{ij}$=1 when the i-th node and the j-th node have direct data exchange, otherwise $a_{ij}$=0; $N_i$ represents an adjacent node set of the i-th node, depending on the communication network topology and changing with a change of the communication network topology; $c_n$ represents a set of the all the n number of nodes of the BESS; and $r_{ij}(k)$ represents an artificially introduced variable.

8. The method according to claim 7, further comprising: obtaining the weight coefficient by a formula (3) expressed as follows:

$$w_i = \frac{w_i' n \varepsilon}{\min_{\forall i \in Z_n} \{w_i'\}} \quad (3)$$

where $w_i'$ is expressed as $$w_i' = \begin{cases} E_{ba,i} \cdot SOC_B^{max} - E_{b,i}(t), & P_B(t) \le 0 \\ E_{b,i}(t) - E_{ba,i} \cdot SOC_B^{min}, & P_B(t) > 0 \end{cases},$$

$E_{ba,i}$ represents a capacity of the BESU i, $E_{b,i}(t)$ represents a residual capacity at current time of the BESU i, n is the number of the BESUs, $SOC_B^{max}$ represents an upper limit of a state of charge of each of the BESUs, and $SOC_B^{min}$ represents a lower limit of the state of charge of each of the BESUs.

9. The method according to claim 7, further comprising: obtaining the introduced variable $r_{ij}(k)$, comprising:
adjusting a constraint range by:
defining $\Delta_i^u(k)$ as a distance between the state $x_i(k)$ and the upper limit $\overline{x}_i$ and defining $\Delta_i^l(k)$ as a distance between the state $x_i(k)$ and the lower limit $\underline{x}_i$, wherein $\Delta_i^u(k)$ and $\Delta_i^l(k)$ are respectively expressed as follows:

$$\begin{cases} \Delta_i^u(k) = |x_i(k) - \overline{x}_i| \\ \Delta_i^l(k) = |x_i(k) - \underline{x}_i| \end{cases}, \quad (4)$$

adjusting the upper limit and the lower limit during iterating as per a formula (5) and a formula (6) in order to make a state outside of the constraint range be transferred to be within the constraint range in a process of iterating, wherein the formula (5) and the formula (6) are respectively expressed as follows:

$$\overline{x}_i' = \begin{cases} \overline{x}_i - \tau \Delta_i^u(k) & x_i(k) > \overline{x}_i \\ \overline{x}_i & x_i(k) \le \overline{x}_i \end{cases}, \quad (5)$$

$$\underline{x}_i' = \begin{cases} \underline{x}_i + \tau \Delta_i^l(k) & x_i(k) < \underline{x}_i \\ \underline{x}_i & x_i(k) \ge \underline{x}_i \end{cases}, \quad (6)$$

wherein the formula (5) and the formula (6) each represent that a constraint boundary is adjusted according to a distance between a current state and the constraint boundary, so that the state outside the constraint range is transferred to be within the state constraint in the process of iterating, and a value range of τ is:

$$0 < \tau < \min\left(\frac{|\overline{x}_i|}{\Delta_i^u(k)}, \frac{|\underline{x}_i|}{\Delta_i^l(k)}\right);$$

calculating intermediate variables as per a formula (7) expressed as follows:

$$\begin{cases} \Delta \overline{x}_i(k) = |x_i(k) - \overline{x}_i'| \\ \Delta \underline{x}_i(k) = |x_i(k) - \underline{x}_i'| \end{cases}; \quad (7)$$

calculating the variable $r_{ij}(k)$, comprising:
sending, by the i-th node, the intermediate variables $(\Delta \overline{x}_i(k), \Delta \underline{x}_i(k))$ and the state $x_i(k)$ to adjacent nodes, and receiving intermediate variables and a state of adjacent j-th node for calculating the variable $r_{ij}(k)$ as per a formula (8) expressed as follows:

$$r_{ij}(k) = \begin{cases} \min\left\{1, \frac{\Delta \overline{x}_i(k)}{|\sigma_{ij}(k)|}, \frac{\Delta \underline{x}_j(k)}{|\sigma_{ij}(k)|}\right\} & \sigma_{ij}(k) > 0 \\ \min\left\{1, \frac{\Delta \overline{x}_j(k)}{|\sigma_{ij}(k)|}, \frac{\Delta \underline{x}_i(k)}{|\sigma_{ij}(k)|}\right\} & \sigma_{ij}(k) < 0 \\ 1 & \sigma_{ij}(k) = 0 \end{cases} \quad (8)$$

where $\sigma_{ij}(k) = x_j(k) - x_i(k)$, $j \in N_i(k)$; $r_{ij}(k)$ is configured to prevent $x_i(k)$ from exceeding the constraint boundaries in the process of iterating when transferring along a direction approaching the constraint boundaries to thereby ensure that a convergence result meets the state constraint.

* * * * *